(12) United States Patent
Higginbotham et al.

(10) Patent No.: US 6,289,301 B1
(45) Date of Patent: Sep. 11, 2001

(54) SYSTEM AND METHODS FOR FRAME-BASED AUGMENTATIVE COMMUNICATION USING PRE-DEFINED LEXICAL SLOTS

(75) Inventors: D. Jeffery Higginbotham, Amherst, NY (US); David Parker Wilkins, Ahnijmegan (NL)

(73) Assignee: The Research Foundation of State University of New York, Albany, NY (US)

( * ) Notice: Subject to any disclaimer, the term of this patent is extended or adjusted under 35 U.S.C. 154(b) by 0 days.

(21) Appl. No.: 09/337,031

(22) Filed: Jun. 25, 1999

Related U.S. Application Data

(62) Division of application No. 08/745,992, filed on Nov. 8, 1996, now Pat. No. 5,956,667.

(51) Int. Cl.$^7$ .............................. G06F 17/27; G06F 17/40
(52) U.S. Cl. .............................. 704/1; 704/9; 340/825.19; 400/87; 434/112; 434/169
(58) Field of Search .............................. 704/1, 9, 10, 270, 704/271, 275, 260; 705/1, 2, 3; 707/530, 531, 532, 534; 340/825.19; 400/87; 434/112, 169

(56) References Cited

U.S. PATENT DOCUMENTS

| | | | |
|---|---|---|---|
| 4,215,240 | * | 7/1980 | Ostrowski .............................. 704/271 |
| 4,688,195 | * | 8/1987 | Thompson et al. ..................... 706/11 |
| 4,785,420 | * | 11/1988 | Little .................................... 704/271 |
| 5,047,953 | * | 9/1991 | Smallwood et al. .................. 704/271 |
| 5,113,481 | * | 5/1992 | Smallwood et al. .................. 704/271 |
| 5,204,905 | * | 4/1993 | Mitome ................................ 704/260 |
| 5,210,689 | * | 5/1993 | Baker et al. ............................ 704/1 |
| 5,299,125 | * | 3/1994 | Baker et al. ............................ 704/9 |
| 5,317,671 | * | 5/1994 | Baker et al. .......................... 704/271 |
| 5,345,538 | * | 9/1994 | Narayannan et al. ................ 704/275 |
| 5,369,574 | * | 11/1994 | Masegi et al. .......................... 704/9 |
| 5,559,693 | * | 9/1996 | Anick et al. ............................ 704/9 |
| 5,649,059 | * | 7/1997 | Tendler et al. ....................... 704/275 |
| 5,802,495 | * | 9/1998 | Goltra ..................................... 705/3 |
| 5,870,701 | * | 2/1999 | Wachtel .................................. 704/9 |
| 5,878,385 | * | 3/1999 | Bralich et al. .......................... 704/9 |
| 5,956,667 | * | 9/1999 | Higginbotham et al. ................ 704/1 |

OTHER PUBLICATIONS

Alm, et al. "Prediction and Conversational Momentum in an Augmentative Communication System"; Communications of the ACM, vol. 35, No. 5, pp. 46–57, May 1992.*

Friedman, et al.: "Natural Language Processing in an Operational Clinical Information System", Natural Language Engineering, vol. 1, No. 1, pp. 83–108, May 1995.*

* cited by examiner

*Primary Examiner*—Joseph Thomas
(74) *Attorney, Agent, or Firm*—Heslin & Rothenberg, P.C.

(57) ABSTRACT

The invention pertains to the field of Augmentative Communication Technology. The invention addresses the problem of providing a communication device for producing message output reflecting a user's intended message which minimizes the amount of user input required to produce a message. The invention pertains to an augmentative communication system in which user input may specify attributes of a predefined subject of desired communication. Responsive to such input, a system in accordance with the invention may provide to the user a set of predefined messages which are pertinent to the specified subject. From this set of messages the user may specify a message to be produced as output for purposes of communication. Alternatively, the user may alter the specified attributes and receive a different set of predefined messages based on the revised specifications.

21 Claims, 29 Drawing Sheets

| SPECIFIC | BASIC | ABSTRACT |
|---|---|---|
| HEAD COLD | COLD/FLU | GENERAL DISEASES |
|  | SYMPTOM | TYPE<br>SYMPTOM |
| SEVERITY<br>CAUSE<br>TIME<br>REMEDY | SEVERITY<br>CAUSE<br>TIME<br>REMEDY | SEVERITY<br>CAUSE<br>TIME<br>REMEDY |

ASSISTING THE USER TO ACCESS A CMF WHICH ADDRESSES THE SUBJECT OF DESIRED COMMUNICATION:

PROVIDING A DEFAULT CMF

PROVIDING A LIST OF FRAME DESCRIPTIONS

PROVIDING FRAMES WHICH CORRESPOND TO A USER-SPECIFIED ROOT WORD

PROVIDING A LIST OF FRAME IDENTIFIERS

INSTANTIATING A CMF

DISPLAYING A CMF

ASSISTING THE USER TO TAILOR MESSAGES OF THE CMF IN ACCORDANCE WITH THE NEEDS OF PRESENT COMMUNICATION:

CHANGE PRAGMATIC PARAMETERS

SELECT DIFFERENT LEXICAL ITEM FROM LEXICAL FIELD

PRODUCING MESSAGE OUTPUT

ASSISTING THE USER TO NAVIGATE TO A NEW CMF FROM A PRESENT CMF ALONG PREDEFINED NAVIGATIONAL PATHS:

MESSAGE BASED NAVIGATION

FRAME SHIFITING

NEAREST NEIGHBOR NAVIGATION

| FIELD: | DESCRIPTION | TD/CMF IDENTIFIERS |
|---|---|---|
| FIELD DESCRIPTION: | A BRIEF DESCRIPTION OF THE SUBJECT TO WHICH THE FRAME PERTAINS | IDENTIFIERS OF RECORDS IN TD AND CMF DATABASES FOR THE FRAME |
| EXAMPLE: | TALKING ABOUT HEADACHE | ILLNESS; HEADACHE | fig. 10A

| FIELD: | ROOT WORD | SEMANTIC TAGS |
|---|---|---|
| FIELD DESCRIPTION: | A BASIC ROOT WORD SEARCH TERM | SEMANTIC TAGS ASSOCIATED WITH THE ROOT WORD |
| EXAMPLE: | HEADACHE | SICK, ILL, DOCTOR, MEDICINE, ACHES |

TOPIC DOMAIN ATTRIBUTE (TDA) DATABASE

| FIELD: | COMMUNICATION FRAME (CMF) IDENTIFIER | TOPIC DOMAIN (TD) IDENTIFIER | NEAREST NEIGHBORS | FRAME SHIFT IDENTIFIERS | SEMANTIC TAGS |
|---|---|---|---|---|---|
| FIELD DESCRIPTION: | IDENTIFIES A CMF AND THE LEVEL OF THE CMF IN THE TOPIC DOMAIN RELATIVE TO THE BASIC LEVEL OF THE TD | IDENTIFIES THE TD WHOSE ATTRIBUTES ARE PROVIDED IN THE RECORD | IDENTIFIES THE CMF's NEAREST NEIGHBORS AND THEIR RELATIVE POSITIONS WHEN THE CMF APPEARS IN THE IDENTIFIED TD | IDENTIFIES OTHER CMFs OUTSIDE OF THE TD WHICH MAY BE DIRECTLY ACCESSED BECAUSE OF A RELATIONSHIP IMPLIED BY THIS TD | WORDS WHICH DESCRIBE THE TD |
| EXAMPLE: | COLD/FLU,B | ILLNESS | u: GENERAL-DISEASES, d1. HEAD-COLD, d2. ASIAN-FLU | TALK ABOUT PEOPLE, DOCTOR | SICK, ILL |

*fig. 11B*

COMMUNICATION FRAMES (CMFs) DATABASE

| FIELD: | COMMUNI-CATION FRAME (CMF) IDENTIFIER | BASIC LEVEL IDENTIFIER | COMPONENT FRAMES (CPF) | DISPLAY TEMPLATE | DEFAULT PRAGMATIC PARAMETERS | FRAME SHIFT IDENTIFIER | SEMANTIC TAGS |
|---|---|---|---|---|---|---|---|
| FIELD DESCRIP-TION: | IDENTIFIES THE CMF DESCRIBED IN THE RECORD | IDENTIFIES A BASIC LEVEL FRAME TO WHICH THE CMF IS RELATED | IF A BASIC LEVEL CMF, IDENTIFIES CPFs OF THE CMF AND THEIR RELATION-SHIPS, IF NOT A BASIC LEVEL CMF, SPECIFIES CHANGES RELATIVE TO RELATED BASIC LEVEL CMF | POINTS TO PROPER DISPLAY TEMPLATE FOR DISPLAY-ING CMF | DEFAULT PRAGMATIC PARAMETERS FOR CONSTRUCT-ING MESSAGES OF THE CMF | IDENTIFIES OTHER CMFs OUTSIDE OF THE TD WHICH MAY BE DIRECTLY ACCESSED BECAUSE OF A RELATION-SHIP IMPLIED BY THIS CMF | WORDS WHICH DESCRIBE THE RECORD |
| EXAMPLE: | COLD/FLU | COLD/FLU | SYMPTOM> SEVERITY> CAUSE>TIME> REMEDY | t5 | TENSE.PRES, WHO.1STSING | TALK ABOUT PEOPLE, DOCTOR; SHOPPING, PHARMACY | COLD, FLU, COUGH, SORE |

*fig. 12B*

COMPONENT FRAMES (CPFs) DATABASE

| COMPONENT FRAME (CPF) IDENTIFIER | MESSAGE FRAME (MF) IDENTIFIERS | FRAME SHIFT IDENTIFIERS | SEMANTIC TAGS |
|---|---|---|---|
| IDENTIFIES THE CPF | IDENTIFIES THE MFs ASSOCIATED WITH THE CPF, A LEXICAL FIELD ASSOCIATED WITH THE MF, AND A DEFAULT LEXICAL ITEM | IDENTIFIES OTHER CMFs OUTSIDE OF THE TD WHICH MAY BE DIRECTLY ACCESSED BECAUSE OF A RELATIONSHIP IMPLIED BY THIS CPF | WORDS WHICH DESCRIBE THE CPF |
| SYMPTOM1 | MF101.BODYLOC.LEG | PEOPLE. DOCTOR | SYMPTOM |

FIELD:

FIELD DESCRIPTION:

EXAMPLE:

*fig. 13B*

MESSAGE FRAMES (MFs) DATABASE

| FIELD: | MESSAGE FRAME (MF) IDENTIFIER | BASE VERSION OF MF | DISPLAY VERSION | OUTPUT VERSION | FRAME SHIFT IDENTIFIER |
|---|---|---|---|---|---|
| FIELD DESCRIPTION: | IDENTIFIER OF THE MF | A TENSE AND LEXICAL ITEM-NEUTRAL FORMULA FOR CONSTRUCTING THE MF | POINTER TO PROPER DISPLAY VERSION FOR DISPLAYING MESSAGE | POINTER TO PROPER DISPLAY VERSION FOR DISPLAYING MESSAGE | IDENTIFIER OTHER CMFs OUTSIDE OF THE TD WHICH MAY BE DIRECTLY ACCESSED BECAUSE OF A RELATIONSHIP IMPLIED BY THIS MF |
| EXAMPLE: | MF101 | @PPN + @V/FEEL + %SLOT | TEXT | TEXT | PEOPLE. DOCTOR | fig. 14B

MESSAGE CONSTRUCTION DATABASE

| MESSAGE COMPONENT IDENTIFIER | PRAGMATIC SPECIFIER | FINAL FORM |
|---|---|---|
| IDENTIFIER OF A MESSAGE COMPONENT | A PRAGMATIC SPECIFIER | THE MESSAGE COMPONENT IN ACCORDANCE WITH THE PRAGMATIC SPECIFIER |
| V/FEEL | PAST | FELT |

FIELD:

FIELD DESCRIPTION:

EXAMPLE:

*fig. 14C*

MESSAGE RECORD PROVIDED BY MESSAGE INSTANTIATOR

| MF IDENTIFIER |
| --- |
| BASE VERSION |
| MESSAGE |
| DISPLAY POINTER(S) |
| OUTPUT POINTER |
| LEXICAL ITEM |
| MF FRAME SHIFT IDs |
| MF SEMANTIC TAGS |
| LEXICAL FIELD IDENTIFIER |

*fig. 14D*

COLD/FLU

SYMPTOM

I FEEL SORE.

I AM CONGESTED.

MY HEAD HURTS.

TIME

IT JUST STARTED.

IT STARTED AN HOUR AGO.

I GET IT ALL THE TIME.

SEVERITY

IT HURTS A LITTLE.

IT'S BETTER.

REMEDY

I NEED TO SEE A DOCTOR.

I NEED TO TAKE ASPIRIN.

I NEED TO SLEEP.

CAUSE

MY FRIEND HAD THE FLU.

I WAS OUT IN THE RAIN.

I DON'T KNOW.

*fig. 15*

DISPLAY TEMPLATES DATABASE

| TEMPLATE IDENTIFIER | TEMPLATE DATA |
|---|---|
| TEMP1 | A,D;B,E;C,F |

FIELD: TEMPLATE IDENTIFIER | TEMPLATE DATA

FIELD DESCRIPTION: IDENTIFIER OF A DISPLAY TEMPLATE | DATA REPRESENTING A SPECIFIC WAY OF PRESENTING A CMF DISPLAY

EXAMPLE: TEMP1 | A,D;B,E;C,F

*fig. 16A*

DISPLAY VERSIONS DATABASE

| MESSAGE COMPONENTS | DISPLAY VERSION |
|---|---|
| MC104 | FELT |

FIELD: MESSAGE COMPONENTS | DISPLAY VERSION

FIELD DESCRIPTION: IDENTIFIER OF A MESSAGE COMPONENT | THE MESSAGE COMPONENT FORMATTED FOR DISPLAY

EXAMPLE: MC104 | FELT

*fig. 16B*

LEXICAL FIELD DATABASE

| LEXICAL FIELD IDENTIFIER | LEXICAL ITEMS | DISPLAY FORMAT |
|---|---|---|
| IDENTIFIER OF THE LEXICAL FIELD | LEXICAL ITEMS CONTAINED IN THE LEXICAL FIELD | POINTER TO DISPLAY TEMPLATE FOR DISPLAYING THE LEXICAL FIELD |
| BODYPART; LOCATION | HEAD, NECK, SHOULDERS, TORSO, ABDOMEN, GROIN | LIST |

FIELD:

FIELD DESCRIPTION:

EXAMPLE:

*fig. 18A*

OUTPUT DATABASE

| FIELD: | MESSAGE COMPONENT LABEL | OUTPUT VERSION |
|---|---|---|
| FIELD DESCRIPTION: | IDENTIFIER OF A MESSAGE COMPONENT | THE MESSAGE COMPONENT FORMATTED FOR DISPLAY |
| EXAMPLE: | FELT | SYNTHESIZED SPEECH DATA FOR "FELT" |

*fig. 19B*

PARALANGUAGE SPECIFIER DATABASE

| FIELD: | MESSAGE FRAME IDENTIFIER | PARALINGUISTIC CONTROL PARAMETERS |
|---|---|---|
| FIELD DESCRIPTION: | AN IDENTIFIER OF THE MESSAGE FRAME OF A MESSAGE TO BE PROVIDED AS OUTPUT | OUTPUT CONTROL PARAMETERS SPECIFIC TO THE ASSOCIATED MESSAGE FRAME (e.g. INTONATION, PITCH VARIABILITY, LOUDNESS, DISPLAY CHARACTERISTICS) |
| EXAMPLE: | U101 | I=D2, PV=3, L=2, DC=SSP |

*fig. 19C*

SYSTEM AND METHODS FOR FRAME-BASED AUGMENTATIVE COMMUNICATION USING PRE-DEFINED LEXICAL SLOTS

This appln is a Div. of Ser. No. 08/745,992 filed Nov. 8, 1996, U.S. Pat. No. 5,956,667.

FIELD OF THE INVENTION

The invention pertains to the field of Augmentative Communication Technology. The invention addresses the problem of providing a communication device for producing message output reflecting a user's intended message which minimizes the -amount of user input required to produce a message.

BACKGROUND OF THE INVENTION

The field of Augmentative Communication Technology (ACT) pertains to the application of technology to the problem of facilitating communication by individuals whose own abilities are not sufficient to allow them to communicate successfully. ACT devices may therefore be understood as "communication prostheses" for individuals with communication disabilities. State of the art. ACT devices employ computer and data processing technology to facilitate communication. In general these devices receive input from the user and translate that input into an output message which approximates the message which the user wishes to communicate. Known technology allows messages to be provided in a number of forms, including visual displays and synthesized speech.

A goal in the field of ACT is to increase the rate of communication attainable through ACT devices by reducing the amount of input which is required to produce a desired message. This goal has been pursued to date primarily through the development of user interfaces which employ coding systems to invoke desired messages. In such devices, the ACT device produces output which is associated with a code supplied by the user. For example, a device may associate the code "greeting" with the message "Hello, my name is Jeff." Thus, when supplied with the input code "greeting", the device will produce the code's associated message.

A number of coding systems are currently employed by ACT devices. A first type of coding system employs fixed codes which correspond to output messages which may be produced by the system. Various fixed code schemes use truncated words, words without vowels, contractions, or sequences of graphic characters as input codes. For example, in a fixed code system, input consisting of an "apple" icon followed by a "building" icon may represent the word "school". Coding systems may also use input comprising-combinations of icons and letters.

Fixed code systems generally require the user to input the full code which corresponds to a desired output message. However, some fixed code systems utilize simple predictive algorithms to present the user with a variety of input choices based on the input of a partial code. In one such scheme known as "word prediction", the user provides a truncated input code and the device displays one or more numbered "candidate", words which may correspond to the full input word intended by the user. Completion of code input is accomplished by the user's selection of the number corresponding to the proper candidate word. Similarly, in icon based coding systems, the input of a first icon of an icon sequence may produce a display of a grid of additional icons which are known by the system to follow the first icon in various input codes.

An alternative coding system employed in some ACT devices is known as variable coding. Variable coding systems are distinguished from fixed coding systems in that codes are not strictly associated with a fixed message. Rather, the message associated with a code may vary depending upon factors such as the frequency or recency of use, or the probable grammatical category of the message. Thus the hierarchy of messages and codes in a variable system is optimized by the system to correspond to the user's history of use.

As an alternative to coding systems, some ACT devices employ databases containing output messages and associated search attributes. The characteristics of a desired output message are indicated by the user in the form of a search string. The device then produces a list of messages having the attributes indicated by the search string, from which the user may select a message for output.

SUMMARY OF THE INVENTION

While present technology enables the devices and methods described above, the performance which present technology provides is limited because users are required to learn a set of codes or search attributes which must be provided to the system in order to produce desired messages. Thus the rate of communication is limited by the ability of the user to interface with the system, which may ultimately depend on the user's cognitive ability. This requirement is at odds with the basic purpose (f assisting those who have difficulty with communication. Moreover, present technology lacks the ability to provide likely subsequent messages based on present communication, and therefore requires complex and often redundant input to invoke each output message. Thus the performance provided by known applications of technology to the goals of ACT is limited by the ability of the user to supply input.

In contrast to present technology, the present invention facilitates communication without requiring the user to learn and to provide complex and redundant input. In general terms, the invention pertains to an ACT system in which user input may specify attributes of the subject of desired communication. Responsive to such input, a system in accordance with the invention may provide to the user a set of messages which are pertinent to the specified subject. From this set of messages the user may specify a message to be produced as output for purposes of communication. Alternatively, the user may alter the specified attributes and receive a different set of messages based on the revised specifications.

The invention may be embodied in a system having a collection of predefined messages for generation as output by the system. The system further includes a predefined organizational structure which associates messages with predefined attributes of predefined subjects of communication. User input specifying predefined attributes may thus be used to produce a set of messages from which the user may select a message for output.

It is preferred that the predefined organizational structure for associating messages with attributes of subjects is provided as a "frame-based" message topology. In this form of message organization, a frame is a set of messages which pertain to a particular subject of communication. Thus a message which may pertain to a variety of subjects, for example, "I feel sore", will likewise be associated with a frame pertaining to each-of those subjects. In the context of the invention, the frame-based message organizational structure is implemented such that predefined subject attributes are associated with predefined frames. Thus upon receiving user specification of subject attributes, the system may provide a frame, i.e. a set of messages, which corresponds to those attributes.

Thus the invention may be embodied in a system for providing augmentative communication in which user specified subject attributes are used to produce a set of messages which are determined to be pertinent to communication as a result of a predefined association with the specified attributes. The invention may similarly be embodied in methods for providing augmentative communication in such a system, and in computer program products for implementing such a system on a computer. Additional features of the invention are disclosed in the figures and detailed description which follow.

DESCRIPTION OF DRAWINGS

The summary of the invention provided above, as well as other novel features, devices, and methods of operation pertaining to the invention, will be more readily understood from the following detailed description and the accompanying drawings in which:

FIG. 8 illustrates six classes of functions preferably performed by a system in accordance with the invention;

FIG. 9 illustrates a frame description database which may be included in a user interface object in accordance with the invention;

FIG. 10a illustrates a root word lexicon which may be included in a user interface object in accordance with the invention;

FIG. 11b illustrates an example of a topic domain attribute database which may be included in a topic domain attribute generator in accordance with a preferred embodiment of the invention;

FIG. 12b illustrates an example of a CMF database which may be included in a CMF instantiator in accordance with a preferred embodiment of the invention;

FIG. 13b illustrates an example of a CPF database which may be included in a CPF instantiator in accordance with a preferred embodiment of the invention;

FIG. 14b illustrates an example of a message frame database which may be included in a message instantiator in accordance with a preferred embodiment of the invention;

FIG. 14c illustrates an example of a message construction database which may be included in a message instantiator in accordance with a preferred embodiment of the invention;

FIG. 14d illustrates an example of a message record as provided by a message instantiator in accordance with a preferred embodiment of the invention;

FIG. 15 illustrates an example of a textual display of messages of a CMF in accordance with the invention;

FIG. 16a illustrates an example of a display template database which may be included in a display object in accordance with a preferred embodiment of the invention;

FIG. 16b illustrates an example of a display versions database which may be included in a display object in accordance with a preferred embodiment of the invention;

FIG. 18a illustrates an example of a lexical field database which may be included in a lexical field generator in accordance with a preferred embodiment of the invention;

FIG. 19b illustrates an example of an output database which may be included in an output object in accordance with a preferred embodiment of the invention;

FIG. 19c illustrates an example of a paralanguage specifier database which may be included in an output object in accordance with a preferred embodiment of the invention;

DETAILED DISCLOSURE OF THE INVENTION

The invention pertains to an ACT system in which user input may specify attributes of the subject of desired communication. Responsive to such input, a system in accordance with the invention may provide to the user a set of messages which are pertinent to the specified subject. From this set of messages the user may specify a message to be produced as output for purposes of communication. Alternatively, the user may alter the specified attributes and receive a different set of messages based on the revised specifications.

Disclosure of the invention is presented in three sections. The first section describes a preferred frame-based message topology for association of predefined messages with predefined subject attributes. The second section describes a preferred system embodying the invention which is implemented on a data processing device using an object-oriented design paradigm. The third section presents suggestions for modifications which may be made to the disclosed embodiment in accordance with the invention.

Figure 1:
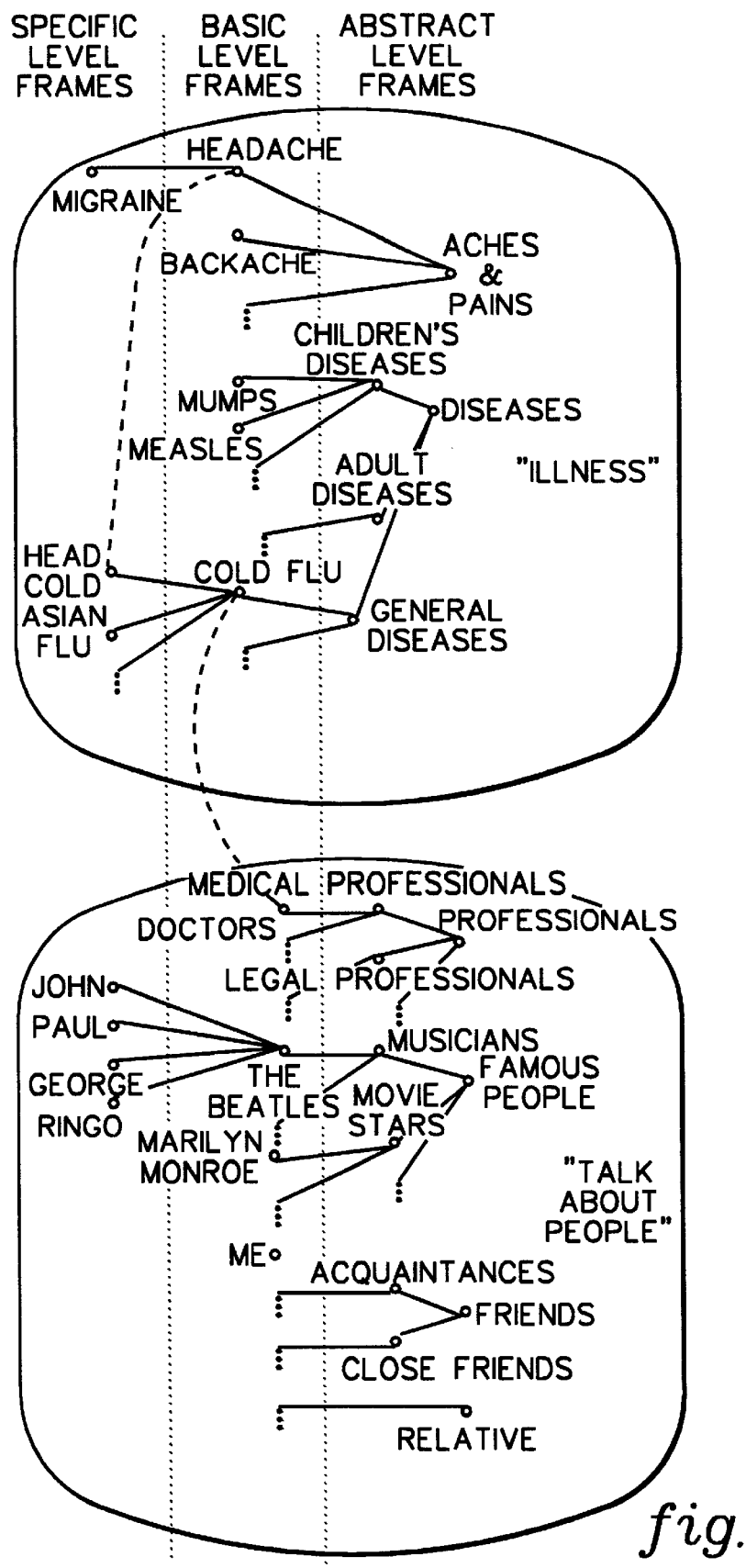
FIG. 1 provides an exemplary topographical representation of relationships within and between two topic domains in accordance with the invention.

I. A preferred frame-based message topology for association of predefined messages with predefined subject attributes Augmentative communication may be provided in accordance with the invention through the implementation of a frame-based message topology which associates predefined subject attributes with sets of messages. FIG. 1 illustrates an example of a frame-based message topology. Specifically, FIG. 1 illustrates two exemplary "topic domains" (TDs). The TDs of FIG. 1 consist of an "Illness" topic domain and a "Talk About People" topic domain. Each TD contains a variety of "communication frames" (CMFs). As stated above, a frame is a set of messages pertaining to a particular subject of communication. Each frame within a topic domain contains a set of messages which pertain to a subject which is defined in part by the topical attribute which may be inferred from the title of the topic domain. For example, each CMF within the "Illness" TD addresses a subject pertaining to illness.

Figure 2:
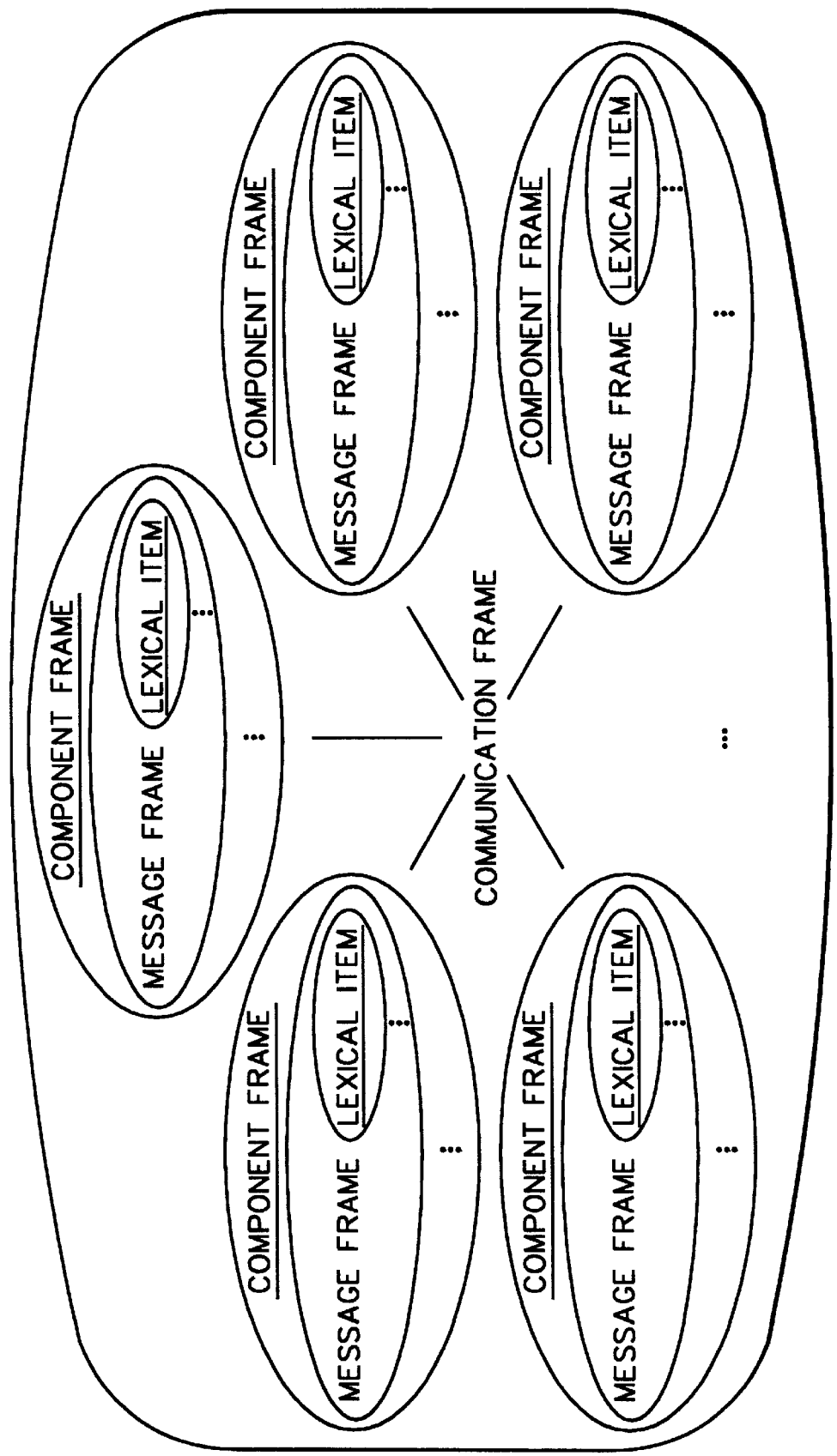
FIG. 2 provides a generic topographical representation of constituents of a communication frame in accordance with the invention.

The set of messages contained within a communication frame is preferably organized in accordance with a generic predefined intraframe topology. FIG. 2 provides a generic representation of a preferred predefined constituent for a CMF. As shown in FIG. 2, a communication frame may consist of subordinate frames known as "component frames" (CPFs). A component frame encompasses a predefined set of messages pertaining to the subject of a communication frame. A component frame is thus a constituent frame of a communication frame. More particularly, a component frame encompasses a set of messages pertaining to a particular aspect of the subject of its superordinate communication frame.

Figures 3, 3A:
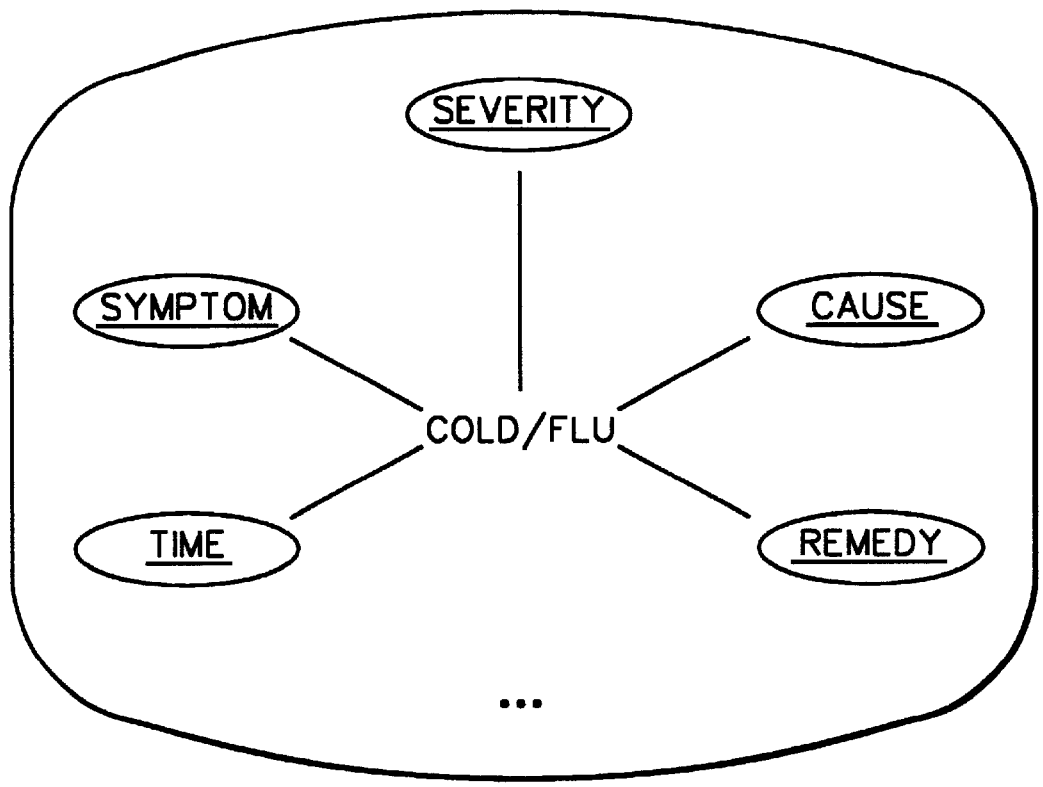
FIG. 3 provides an exemplary topographical representation of the component frames of a communication frame in accordance with the invention.
FIG. 3a provides an exemplary comparative illustration of the component frames of three related communication frames in accordance with the invention.

FIG. 3 provides an exemplary illustration of component frames of a communication frame. Specifically, for the CMF "Cold/Flu" (illustrated in FIG. 1), there may be a number of subordinate frames containing sets of messages pertaining to particular subjects within the subject of the "Cold/Flu" CMF. For example, as shown in FIG. 3, a "Cold/Flu" CMF may contain CPFs pertaining to "Time", "Symptom", "Severity", "Cause", and "Remedy".

Returning to FIG. 1, it may be further seen that the communication frames of a topic domain fall within one of three distinct classes. The most fundamental class of CMFs are the "basic level" communication frames. Basic level CMFs are CMFs which pertain to subjects which are easily recognized and envisioned by the user. For example, as shown in FIG. 1, a CMF pertaining to the subject "Headache" may be considered a basic level CMF. As further shown in FIG. 1, a topic domain may contain a large number of basic level CMFs.

CMFs which are not defined as pertaining to a basic level subject may be defined as pertaining to either a "specific level" subject or an "abstract level" subject. As these categories imply, specific level CMFs address subjects which would be considered more specific than the typical basic level subject, while abstract level CMFs address subjects which would be considered less specific than the typical basic level subject.

As further shown by the solid lines connecting certain CMFs in FIG. 1, the CMFs of a topic domain may bear specific relationships to one another by virtue of relationships among the subjects to which they pertain. These relationships are revealed through comparison of the messages, and hence the CPFs, of related CMFs. FIG. 3a illustrates an example of the CPFs of three related CMFs from FIG. 1. As shown in FIG. 3a, the basic level CMF "Cold/Flu" may include the CPFs "Symptom", "Severity", "Cause", "Time", and "Remedy". In comparison, the specific level "Head Cold" CMF may contain all of the CPFs of the "Cold/Flu"CMF except for the "Symptom" CPF, because when the subject of communication is a head cold, the symptoms of the cold will be implicit to the conversants. Thus the specific level "Head Cold" CMF is related to the basic level "Cold/Flu" CMF in that it contains all but one of-the "Cold/Flu" CPFs. Similarly, the abstract level "General Diseases" CMF contains all of the "Cold/Flu" CPFs, and in addition contains a "Type" CPF. A "Type" CPF is included in the "General Diseases" CMF because in addition to addressing the subjects of the "Cold/Flu" CMF, conversants addressing the subject of general diseases may wish to communicate as to a specific type of disease. In other words, they may require a set of messages specifically addressing disease types. It is noted that additions or deletions of component frames will depend on the subject of communication, and so may each occur at either the specific or the abstract level.

Thus in accordance with the invention, the constituent CPFs of any CMF may be expressed as the CPFs of a basic level CMF, with CPFs being added or removed in accordance with the subject of the CMF. Referring again to FIG. 3a, "General Diseases" is thus considered to be "Cold/Flu" plus the "Type" CPF, while "Head Cold" is considered to be "Cold/Flu" less the "Symptom" CPF.

As further shown by the broken lines connecting various CMFs in FIG. 1, relationships may be defined to exist between the subjects of some CMFs which do not share a direct relationship in the manner of the CMFs illustrated in FIG. 3a. For example, the "Headache" CMF of the "Illness" TD may be defined to address a subject which shares attributes with the subject of the "Head Cold" CMF. Similarly, the "Cold/Flu" CMF of the "Illness" TD may be defined to address a subject with shares attributes with the "Doctor" CMF of the "Talk About People" TD.

Figure 4:
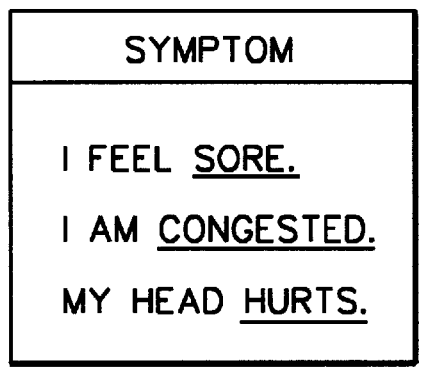
FIG. 4 provides an exemplary topographical representation of message frames and their associated lexical items in a component frame in accordance with the invention.

Returning to the generic topology of FIG. 2, it may be further seen that the messages of each component frame may be defined to comprise a "message frame" (MF). A message frame may include a "lexical slot" which contains a "lexical item". Exemplary messages including message frames having associated lexical slots containing lexical items are illustrated in FIG. 4. As shown in FIG. 4, a component frame pertaining to the subject "Symptom" may include several messages, including the messages "I feel sore", "I am congested", and "My head hurts". As further indicated in FIG. 4, the subject/verb pair "I feel" may be a predefined message frame which is followed by a lexical slot containing the adjective lexical item "sore".

Figure 5:
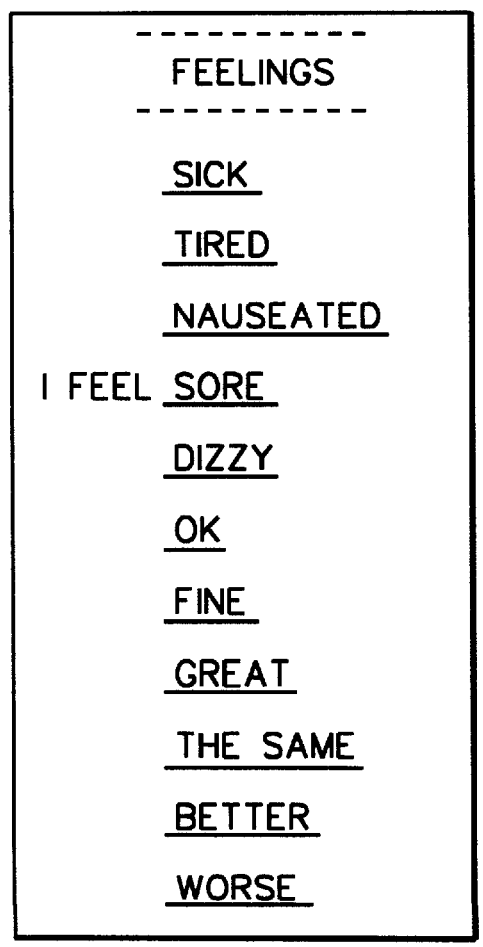
FIG. 5 provides an exemplary topographical representation of the alternate lexical items in a lexical field associated with a message frame in accordance with the invention.

The lexical item contained in a lexical slot of a message frame may be selected from a "lexical field" which comprises a group of lexical items pertaining to the message frame and the subject of communication. Thus, as shown in the exemplary lexical field illustrated in FIG. 5, a lexical item "sore" may be one of a variety of lexical items which are grouped into the lexical field captioned "Feelings". The lexical field "Feelings" may be a predefined lexical field which is associated with the message frame "I feel" when that message frame pertains to a subject addressed by the CMF "Cold/Flu" (see FIG. 1) and the CPF "Symptom". Moreover, the lexical item "sore" may, by default, be the lexical item from the lexical field which is inserted in the lexical slot of the message frame when the message frame pertains to a subject addressed by the CMF "Cold/Flu" and the CPF "Symptom". However, as suggested by FIG. 5, any of the lexical items of the lexical field may be contained in the lexical slot of the message frame "I feel", and each resulting message will bear a relationship to the subject of communication of the TD "Illness", the CMF "Cold/Flu", and the CPF "Symptom". The choice of a particular lexical item for the lexical slot may be predefined in accordance with the attributes of communication reflected by the CMF and/or CPF.

Figure 6:
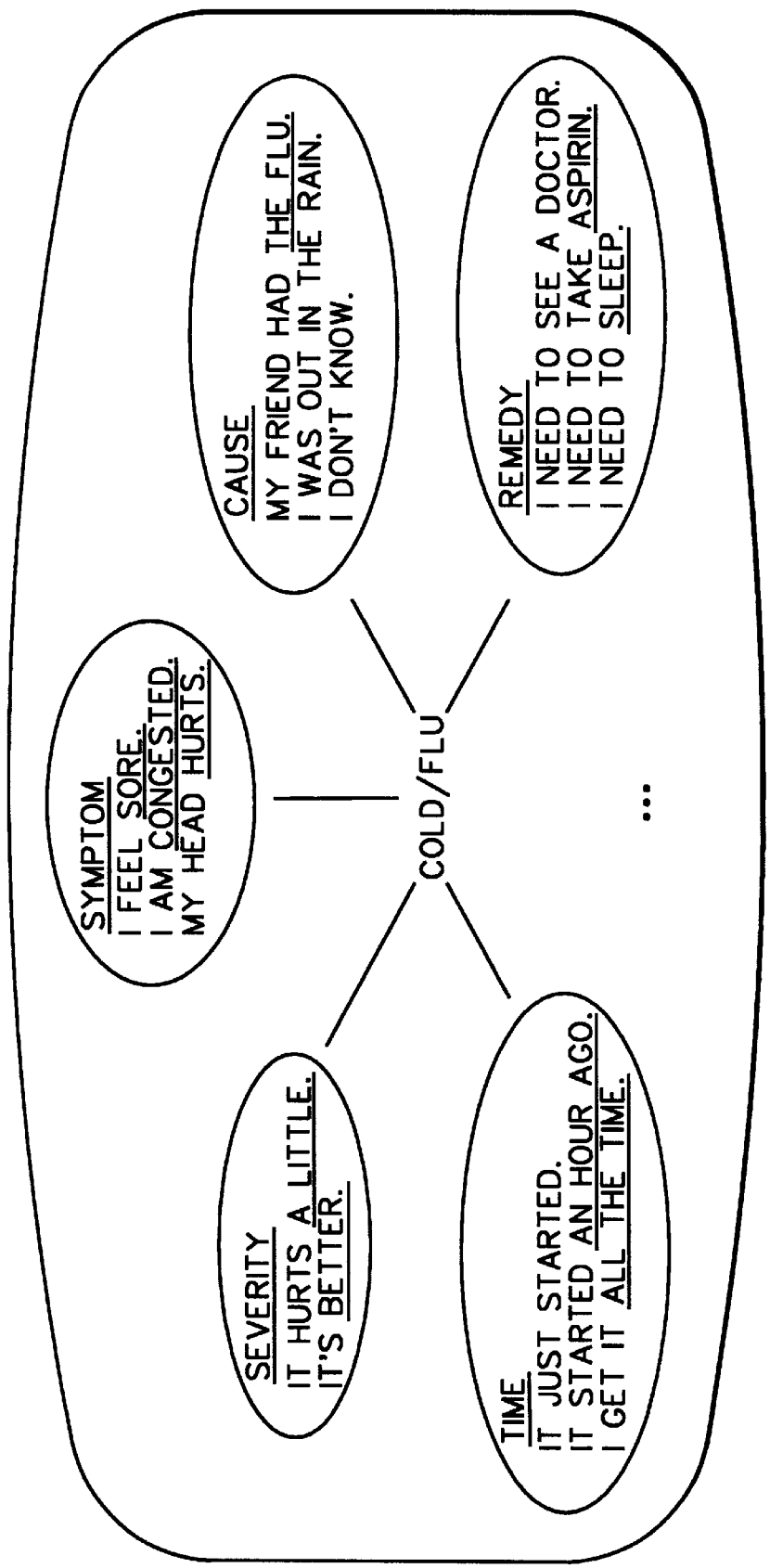
FIG. 6 provides a topographical representation of a communication frame including exemplary component frames, message frames and lexical items.

FIG. 6 provides an illustration of an exemplary communication frame which unites all of the constituent parts described above. As seen in FIG. 6, a "Cold/Flu" CMF may be defined to include a variety of CPFs including "Symptom", "Severity", "Time", "Cause", and "Remedy". Each CPF may in turn be defined to contain a variety of messages, and it may be inferred from the disclosure provided above that the lexical item in the illustrated lexical slots were selected from lexical fields associated with the message frame in the context of the component frame in which it appears.

The organizational structure described above may be implemented to organize a large number of messages in accordance with subjects to which they pertain. Communication frames and component frames may be employed to predefine sets of messages which pertain to a variety of predefined subjects. Message frames and associated lexical fields may be employed to provide a broad range of messages based on each message frame which pertain to the subject of communication. This topology is preferred for providing a frame-based ACT system.

II. A Preferred System Embodying the Invention implemented on a data processing device using an object-oriented design paradigm An ACT system in accordance with the invention may be implemented on a data processing device such as a computer. In general terms, such systems will include a repository of data which specifies messages and predefined relationships between messages and subjects of communication, and a processing device for producing sets of messages in response to user specifications of attributes of the subject of desired communication. As noted above, it is preferred to utilize a message topology as disclosed above. Accordingly, a preferred embodiment of the invention will include an implementation of the message topology disclosed above on a data processing device such as a computer.

A variety of computer programming techniques may be employed to implement an ACT system employing a message topology such as that illustrated in the preceding Section. It is preferred to implement the invention on a computer data processing system using an object-oriented system design paradigm. In general terms, object-oriented data processing systems are partitioned into a number of "objects", each of which is dedicated to performing certain predefined functions. Each object further includes an interface which allows it to receive requests from other objects to perform functions, and to provide data to other objects. The object-oriented system design disclosed below is directed toward providing a frame-based ACT system in accordance with the message topology disclosed above.

Figure 7:
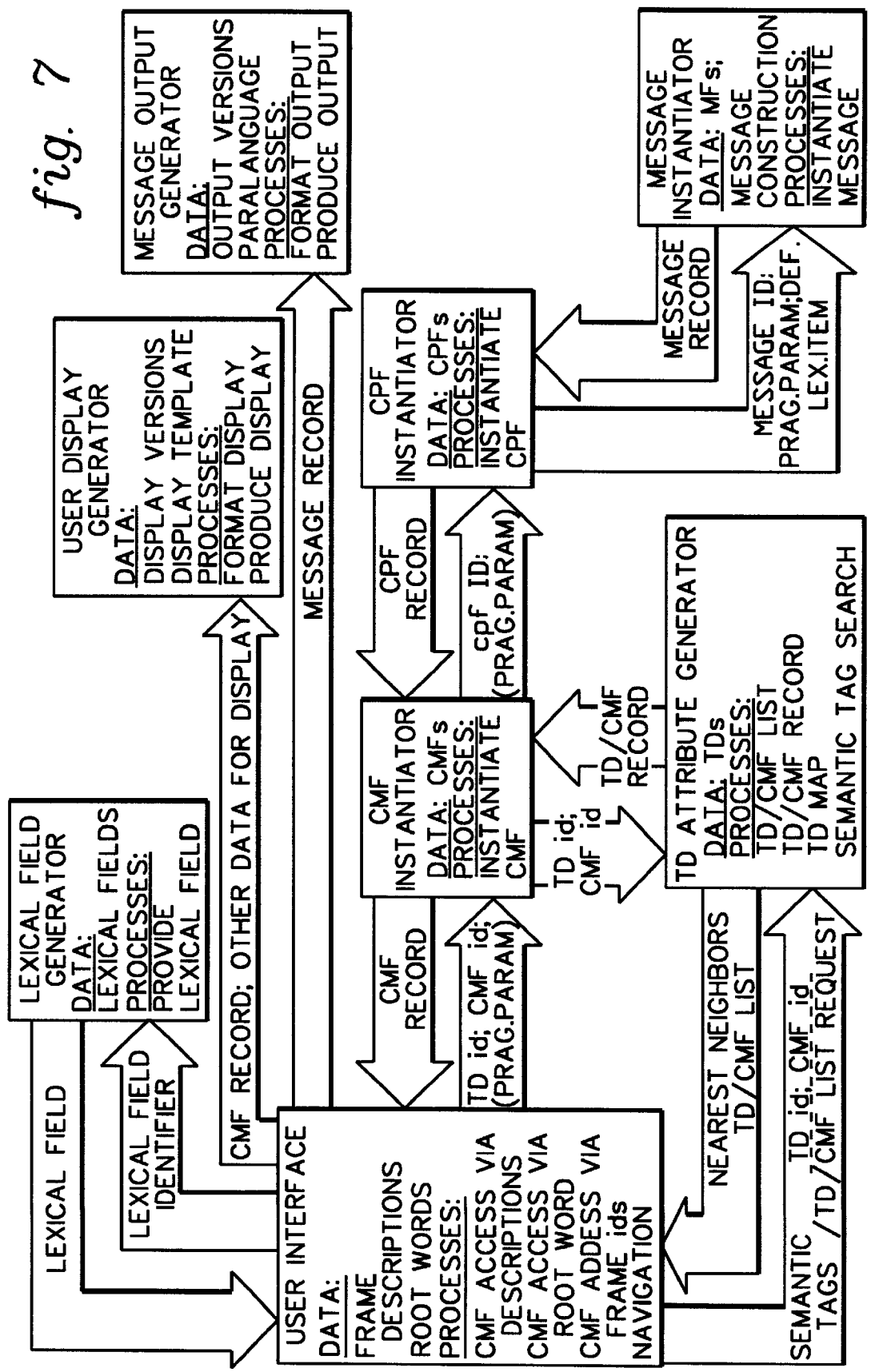
FIG. 7 illustrates objects included in an object-oriented ACT system in accordance with a preferred embodiment of the invention.

Reference is made to FIG. 7, which illustrates objects which may be included in a frame-based ACT system in accordance with the invention. It may be seen from FIG. 7 that the objects of this embodiment include a user interface object, a user display generator, a message output generator, a lexical field generator, a TD attribute generator, a CMF instantiator, a CPF instantiator, and message instantiator. Each of these objects is discussed in detail below. As a general matter, it will be seen from FIG. 7 that each of the objects includes one or more databases (e.g., in the case of the lexical field generator, lexical fields) and particular processes which it performs (e.g., in the case of the lexical field generator, providing lexical fields). In addition, each object is interfaced with at least one other object of the system (e.g., the lexical field generator is interfaced with the user interface object).

There are six general classes of functions which may be performed by an ACT system to provide the preferred functionality for a system in accordance with the invention. FIG. 8 illustrates these classes of functions. They include assisting the user to access a communication frame which addresses the subject of desired communication, instantiating a CMF, displaying the CMF, assisting the user to tailor messages of the CMF in accordance with the needs of present communication, producing message output from the CMF, and assisting the user to navigate to a new CMF from an existing CMF. The objects illustrated in FIG. 7 are designed to interact as a system to perform the functions listed in FIG. 8. For purposes of illustrating particular manners in which these functions may be performed by the system, the six classes of functions will be discussed in the context of an example of user/system interaction which addresses each of the categories in the sequence in which they are illustrated in FIG. 8. Specifically, the example involves a user accessing an initial CMF through various manners of specifying the attributes of the subject of desired communication, instantiation by the system of the CMF, display of the CMF, tailoring of messages of the CMF by the user, production of message output by the system based on a user's choice of a message from the CMF, and navigation to a new CMF through user updating of the attributes of the subject of communication to match those of the new subject of desired communication. While this ordering of events is useful for purposes of disclosure, the order of functions performed by the system may vary in accordance with user input to the system.

A. Assisting the user to access a CMF which addresses the subject of desired communication To begin, consider that a user of a frame-based ACT system has just initiated operation of the system. The user may wish to specify attributes of the subject of communication in order to be provided by the system with a set of messages pertaining to the specified subject. In the functional terms of the invention, the user wishes to cause the system to instantiate a CMF which pertains to the subject of desired communication. As shown in FIG. 8, a default CMF may be predefined within the system as an initial point of entry into the system. However, it is preferable to enable the user to select a subject specification which may then be used by the system to instantiate an appropriate CMF.

A first manner of allowing the user to select a subject specification may involve choosing from a list of frame descriptions. As shown in FIG. 7, CMF access through a list of frame descriptions may be provided by the user interface object. More specifically, the user interface object may include a frame description database as illustrated in FIG. 9. As shown in FIG. 9, the direct access database may comprise records which include a description field containing a description of the subject to which the CMF pertains, and an associated identifier field specifying the identifiers of records in Topic Domain Attribute (TDA) and communication frame (CMF) databases which pertain to the described CMF. The TDA and CMF identifiers are used in the process of instantiating a CMF which is addressed in detail below. Thus, using a frame description database as illustrated in FIG. 9, the user interface object may facilitate user specification of a CMF by allowing the user to read descriptions of frames and to select a description of a frame which addresses the subject of desired communication. Through his selection the user may thus indicate that the TDA and CMF identifiers associated with the selected description are to be used to instantiate a CMF.

An alternative manner of choosing a CMF may involve selecting directly from a list of frame identifiers. As noted above, identifiers of records in a TDA and a CMF database are necessary to allow the system to instantiate a given CMF. However, these identifiers may be chosen to be descriptive in nature, as was seen in the examples of FIG. 1 ("Illness", "Headache", etc.). Accordingly, where descriptive TDA and CMF identifiers are employed, a user may be allowed to view and choose from a list of frame identifiers which each consist of a concatenation of the TDA and CMF identifiers for the frame. More specifically, as shown in FIG. 7, the user interface object may provide a function for allowing a user to access a CMF through a frame identifier list. As further shown in FIG. 7, the system may include a Topic Domain Attribute (TDA) generator which includes a TDA database. The TDA database may include a record for each predefined frame of the system, and each record may include the TDA and CMF identifiers of the frame. An example of a TDA database is shown in FIG. 11b. The TDA attribute generator may include a function for providing a list of concatenated TDA and CMF identifiers upon request from the user interface object. Accordingly, the user may request and be provided with a frame identifier list which will be briefly descriptive of the predefined frames which may be provided by the system. The user's selection of an item from the list thus directly specifies the TDA and CMF identifiers necessary to instantiate the CMF.

As further shown in FIG. 8, a third manner of accessing a CMF may involve determining one or more possible frames based on the specification of a root word by the user which generally describes the desired subject of communication. As shown in FIG. 7, CMF access through root word specification may be provided by the user interface object. More specifically, the user interface object may include a root word lexicon such as that shown in FIG. 10a. As shown in FIG. 10a, a record in the root word lexicon may include a root word field containing a basic root word search term, and an associated semantic tags field containing semantic tags associated with the root word.

Figure 10B:
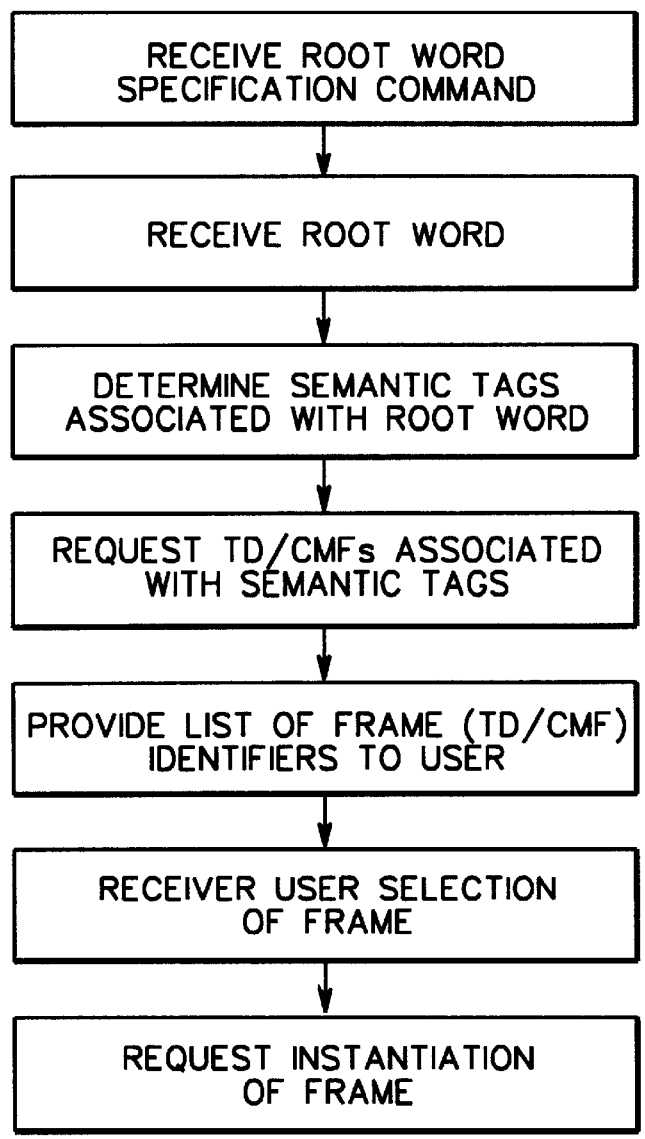
FIG. 10b illustrates an example of a process for specifying a CMF through root word specification in accordance with the invention.

Accordingly, the user interface object may provide CMF access through root word specification. An example of a process for performing this function is illustrated in FIG. 10b. As shown in FIG. 10b, upon receiving a root word specification command and receiving a root word from a user which is chosen by the user to be representative of a subject of desired communication, the user interface object may determine semantic tags associated with the root word through reference to the root word lexicon. The user interface object may then request frame identifiers matching the semantic tags from the TDA generator by providing the semantic tags to the TDA generator. The TDA generator may perform a semantic tag search in its TDA database. Concatenated TDA and CMF frame identifiers retrieved through the semantic tag search may be provided to the user interface object, which may provide the identifiers as a list to the user. When a specification of a frame is received, the object may request instantiation of the specified frame.

Accordingly, a system in accordance with the invention may allow the user to specify a subject of desired communication, and hence a frame to be instantiated, in several manners. Upon receiving such a specification, the system may instantiate the specified CMF. The following section will discuss processes for instantiating a CMF.

B. Instantiating a CMF

Consider that a user has specified a subject of desired communication through specification of a predefined frame. The system has accordingly received input indicating CMF and TDA identifiers of the frame. The system may accordingly provide a set of messages to the user which address the specified subject. In the language of the invention, the system may instantiate the specified CMF.

Figure 11A:
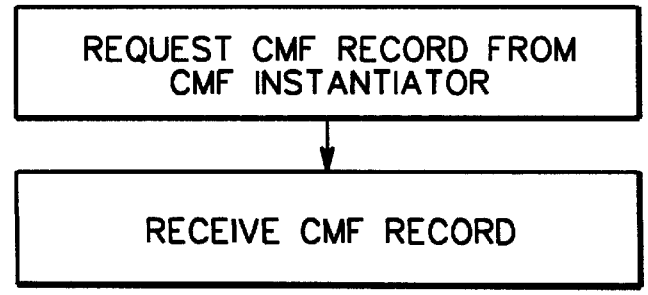
FIG. 11a illustrates an example of a process for generating a CMF record in a user interface object in accordance with a preferred embodiment of the invention.

Instantiation of a CMF involves creating a record containing the component frames and messages of the CMF, as well as other information pertinent to the CMF. The process of instantiating a CMF may be initiated by the user interface object. More specifically, as shown in FIG. 11a, upon determining a frame to be assembled and displayed, the user interface object may request a CMF record from the CMF instantiator. The user interface object will subsequently receive the CMF record from the CMF instantiator.

Figure 12A:
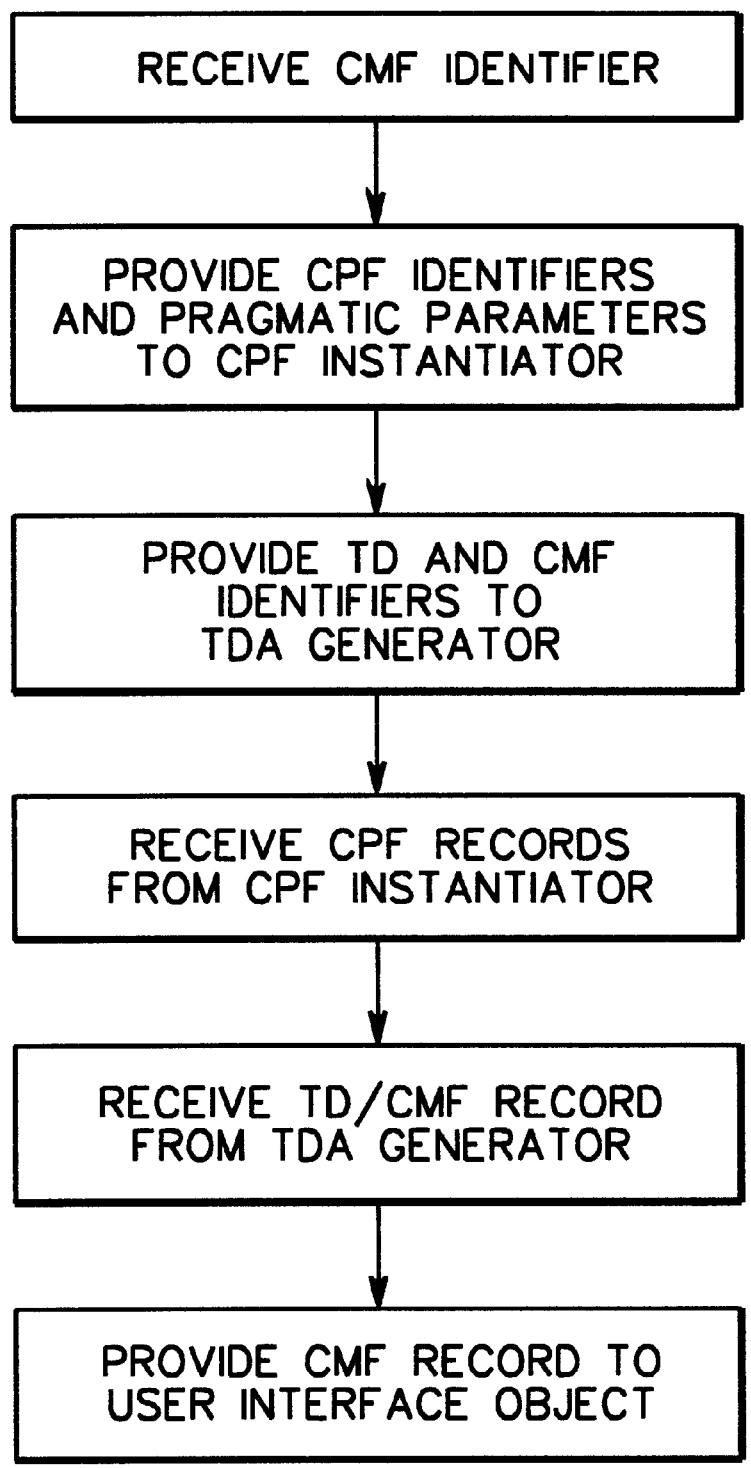
FIG. 12a illustrates an example of a process for instantiating a CMF in a CMF instantiator in accordance with a preferred embodiment of the invention.

The process of instantiating a CMF may be performed as shown in FIG. 7 by a CMF instantiator in conjunction with a CPF instantiator and a message instantiator, and with the TDA generator. As shown in FIG. 7, the CMF instantiator may include a CMF database and a process for instantiating a CMF. An example of a process for instantiating a CMF is provided in FIG. 12a. As shown in FIG. 12a, when the CMF instantiator has received TDA and CMF identifiers corresponding to a selected predefined frame, it may provide CPF identifiers and pragmatic parameters corresponding to the selected frame to the CPF instantiator.

The CPFs corresponding to a CMF may be determined through reference to the CMF database provided in the CMF instantiator. The CMF database defines the CPFs and other attributes of all predefined communication frames of the system. An example of a CMF database is provided in FIG. 12b. As shown in FIG. 12b, each record of the CMF database includes a CMF identifier field and a field containing the identifiers of predefined CPFs associated with the CMF. The CMF instantiator will determine the CPF identifiers associated with the CMF and provide these to the CPF instantiator in the order in which they are presented in the CPF field of the CMF database. The manner in which CPF identifiers and their ranks are determined will vary depending on whether the selected frame is a basic level frame. If the frame is a basic level frame, the CPFs identifiers and their relationships will be fully specified in the CPF field of the frame's record in the CMF database. However, if the selected frame is not a basic level frame, the CPF field of the frames CMF database record will provide only changes of CPFs relative to those of the frame's related basic level listed in the basic level identifier field. Accordingly, to determine all CPFs for the frame, the CMF instantiator may be required to determine the CPFs listed in the CMF database record for the related basic level frame identified in the basic level frame identifier field.

In addition to CPF identifiers, the CMF instantiator will further provide a set of pragmatic parameters to the CPF instantiator. Pragmatic parameters define pragmatic variables which determine the precise formulation of the messages of the CMF. Examples of pragmatic parameters include tense and interpersonal focus. A variety of other pragmatic parameters and their effects in the precise formulation of messages are well-known in the field of linguistics. Assuming that they have not been specified by the user (as discussed below), the pragmatic parameters will also be provided, by default, from the appropriate record of the CMF database.

In addition to providing CPF identifiers and pragmatic parameters to the CPF instantiator, the CMF instantiator will provide the TDA and CMF identifiers to the TDA generator. After receiving each CPF from the CPF instantiator and a TDA record from the TDA generator, the CMF instantiator may provide a full CMF record to the user interface object. The data components which comprise the CMF record will thus include the TDA record and the CPFs and their respective constituent messages. In order to fully discuss the data components of the CMF record, it is useful to first examine the process by which CPFs are instantiated and provided to the CMF instantiator.

Figure 13A:
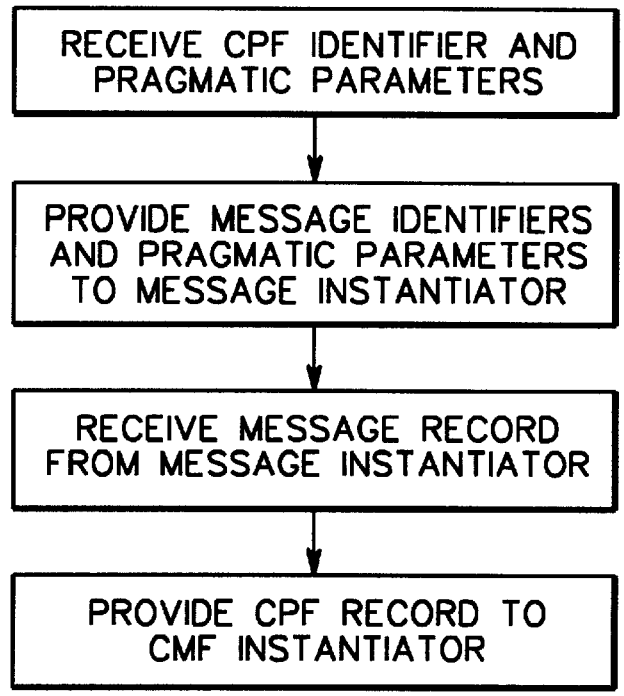
FIG. 13a illustrates an example of a process for instantiating a CPF in a CPF instantiator in accordance with a preferred embodiment of the invention.

As noted above, CPFs may be provided by a CPF instantiator. As shown in FIG. 7, a CPF instantiator may include a CPF database and a CPF instantiation process. An example of a process for instantiating a CPF is provided in FIG. 13*a*. Specifically, when the CPF instantiator receives a CPF identifier and pragmatic parameters, it will provide to a message instantiator the identifiers of messages which are included in the CPF, a default lexical item associated with each message, and the pragmatic parameters of the frame. The message identifiers and their associated default lexical items may be determined through reference to a CPF database as illustrated in FIG. 13*b*. The CPF database includes records specifying the attributes of each predefined CPF of the system. As shown in FIG. 13*b*, the CPF database may include CPF identifiers and associated message frame (MF) identifiers. The MF identifiers of a CPF may be provided to the message instantiator in the order in which they are listed in the MF field of the CPF database. After providing a message identifier and related data to the message instantiator, the CPF instantiator will receive a message record from the message instantiator for the message identifier, lexical item and pragmatic parameters which were provided. Each message record must be updated by the CPF instantiator to reflect the lexical field associated with the message. Upon receiving all requested message records, the CPF instantiator may then provide a CPF record to the CMF instantiator. In order to fully discuss the components of a CPF record, it is useful to first examine the process by which message records are instantiated and provided to the CPF instantiator.

Figure 14A:
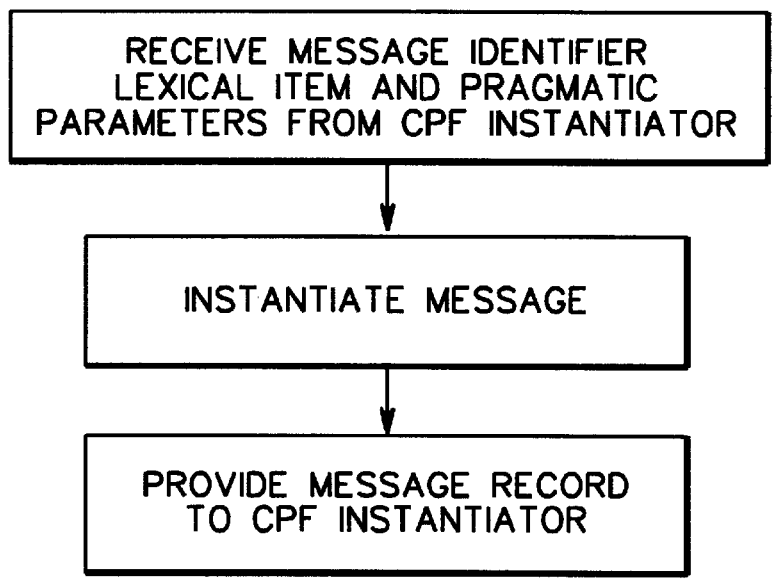
FIG. 14a illustrates an example of a process for instantiating a message in a message instantiator in accordance with a preferred embodiment of the invention.

As noted above, messages may be provided by a message instantiator. As shown in FIG. 7, a message instantiator may include message frame and message construction databases, and a message instantiation process. An example of a process for instantiating a message is provided in FIG. 14*a*. Specifically, when the message instantiator receives a message identifier, lexical item and pragmatic parameters from the CPF instantiator, it will create the message identified by the message identifier in accordance with the specified lexical item and pragmatic parameters. This may be accomplished through reference to a message frame database, an example of which is shown in FIG. 14*b*, and a message construction database, an example of which is shown in FIG. 14*c*. Specifically, upon receiving a message identifier, lexical item, and pragmatic parameters, the message instantiator may determine a formula for creating the appropriate message through reference to the message frame database. Referring to FIG. 14*b*, it may be seen that the message frame database includes "base versions" associated with message identifiers. Base versions are formulas for message frames which express messages in the form of message components which are neutral in regard to the pragmatic parameters and the lexical field of the message. Upon determining the proper base version of the message, the message instantiator may determine the proper form of the message through reference to the message construction database. Referring to FIG. 14*c*, it may be seen that the message construction database includes message component identifiers in association with pragmatic specifiers and final forms of the message components. Thus the message instantiator may determine the proper form of the message components and create from the base version formula a message which corresponds to the specified pragmatic parameters.

Once a message has been instantiated, the message instantiator will provide a message record to the CPF instantiator. As shown in FIG. 14*d*, the message record will contain a number of fields. Included in the message record are the message frame identifier, the message base version, and the message as instantiated by the message instantiator. Additional fields may also be included in the message record. These fields may comprise data taken from the MF database. Specifically, these fields may include a display pointer and output pointer, which respectively indicate display and output formats for the message. The message record may further include a "frame shift" field including identifiers of CMFs which may be navigated to by way of the message. Message-based navigation will be discussed further below. The message record may further include one or more semantic tags which characterize the subject of the message. The use of semantic tags is discussed further below.

Figure 13C:
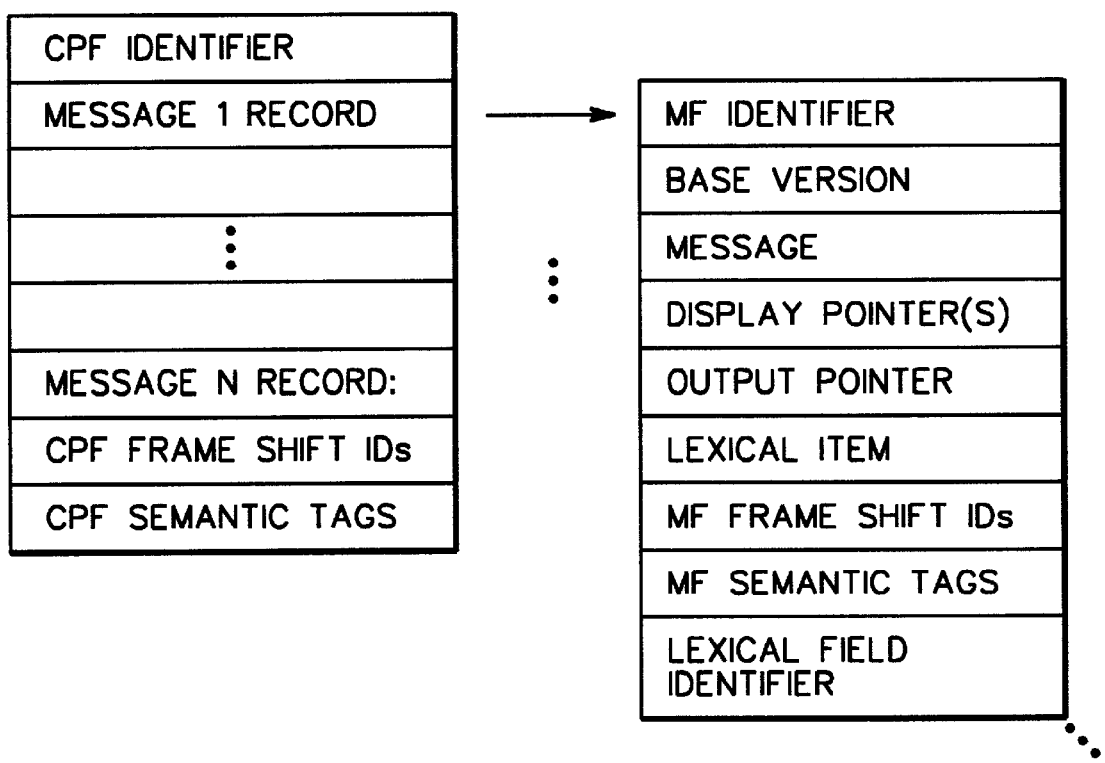
FIG. 13c illustrates an example of a CPF record as provided by a CMF instantiator in accordance with a preferred embodiment of the invention.

A message record will be produced for every message identifier which is provided to the message instantiator. Returning to FIG. 13*a*, the CPF instantiator will accordingly receive a message record for each message for which a message identifier has been supplied to the message instantiator. Thus the CPF record provided to the CMF instantiator will include each of the message records. As noted above, the CPF instantiator will update each message record to include an identifier of a lexical field associated with the message. A CPF record is illustrated in FIG. 13*c*. In addition to containing the message record for each message of the CPF, which is supplemented by the lexical field identifier for each message of the CPF, the CPF record contains additional fields of data which are specific to the CPF itself. These additional fields may include a frame shift field containing identifiers of CMFs which may be desirable, as a result of a relationship implied by the CPF, to navigate to directly from the CMF. Direct navigation is discussed below. The CPF record may further include semantic tags which characterize the subject addressed by the CPF.

Figure 12C:
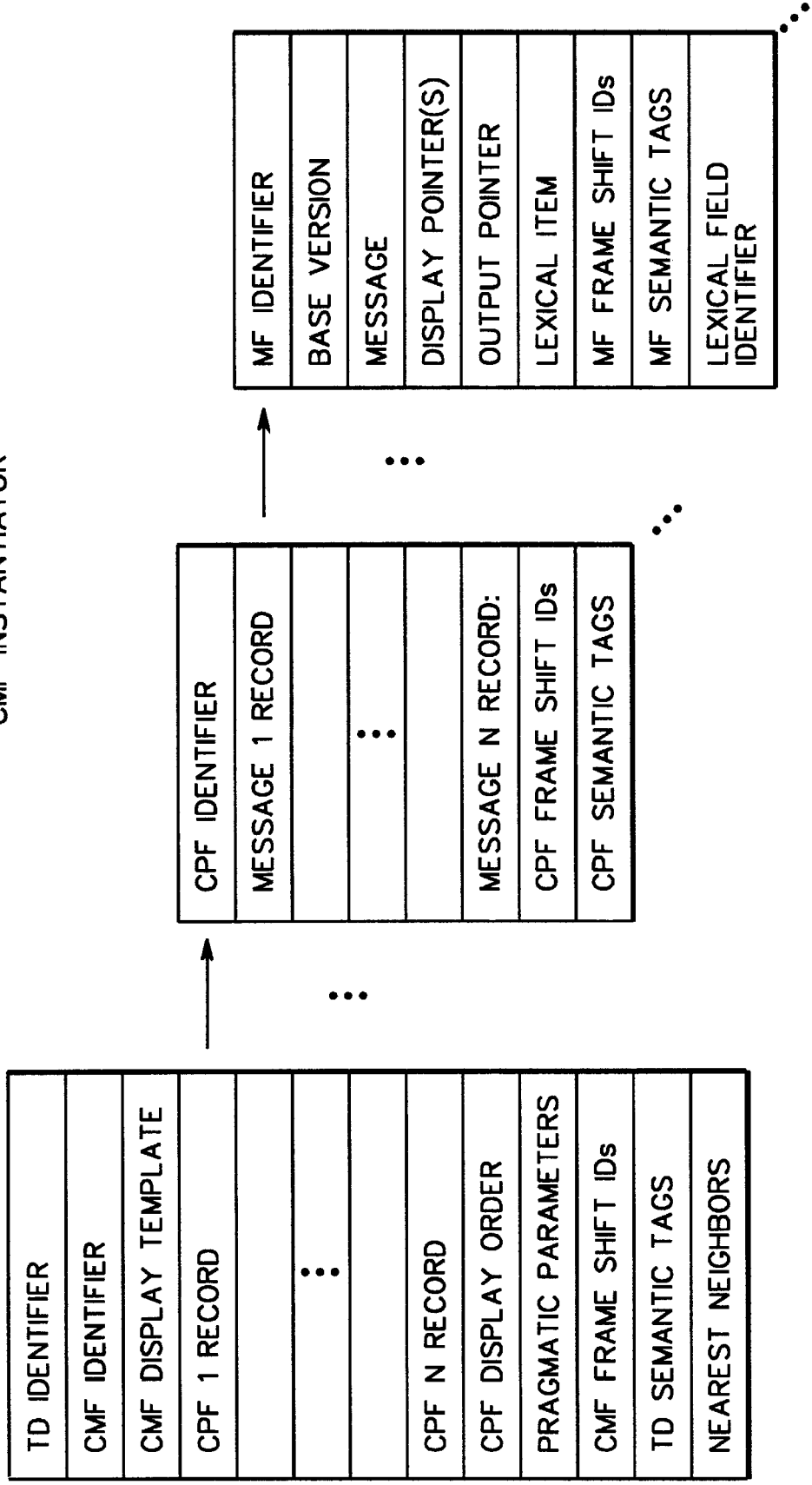
FIG. 12c illustrates an example of a CMF record as provided by a CMF instantiator in accordance with a preferred embodiment of the invention.

A CPF record will thus be produced for every CPF identifier which is provided to the CPF instantiator. Returning to FIG. 12*a*, the CMF instantiator will accordingly receive a CPF record for each CPF identifier which has been provided to the CPF instantiator. The CMF record provided to the user interface will accordingly include each of the CPF records. A CMF record as provided by the CMF instantiator is illustrated in FIG. 12c. In addition to containing the CPF record for each CPF of the CMF, the CMF record contains additional fields of data which are specific to the CMF itself. These additional fields may include a frame shift field containing identifiers of CMFs which may be desirable, as a result of a relationship implied by the CMF, to navigate to directly from the CMF. Direct navigation will be discussed further below. The CMF record may further include semantic tags which characterize the subject addressed by the CMF. The CMF record may further include a display structure relating to the display of the constituent CPFs, and the pragmatic parameters of the CMF.

In addition to containing all fields of the CMF record provided by the CMF instantiator, the CMF record includes fields from the TDA record received from the TDA Specifier. Among these fields is an additional frame shift field containing identifiers of CMFs which may be desirable, as a result of a relationship implied by the TD, to navigate directly to from the CMF. Also among these fields is a semantic tag field containing one or more semantic tags which characterize the TD of the CMF.

C. Displaying a CMF

As described above, a CMF record received from the CMF instantiator will include all data characterizing the CMF. The user interface object may then act to initiate the display of the CMF to the user. An example of a display of a CMF is provided in FIG. 15. The display includes several represented relationships and functional features. For example, it may be seen from FIG. 15 that variable lexical items may be indicated by underlining, that messages may be grouped in association with component frames, that component frames and messages may be provided in a particular order, and that some messages, referred to as "frame shifting messages", may be displayed in italics.

The generation of such a display may be performed by a user display generator. As shown in FIG. 7, the system may include a user display generator which includes processes for formatting and producing displays for the system user. The user display generator may thus produce a display of a CMF upon receiving data specifying the CMF to be displayed.

A manner of formatting a display such as that of FIG. 15 may be understood through reference to the data which will determine the format of the display. As noted above, the user display object is provided with a CMF record which includes data for each message in association with a CPF identifier. Thus the CPF identifier may be used as a CPF heading and the messages of the CPF may be displayed in the order of their association with the CPF, which in turn is determined by the order in which they are listed in the MF field of the CPF database (FIG. 13b). Similarly, the display structure of CPFs within the CMF may be determined from the CPF display structure, which originates in the CPF relational information provided in the CPF field of the CMF database. Lexical items may be determined from the base version and lexical item fields of the message, and the title of the CMF may be determined from the CMF identifier field of the CMF record. Messages which function as frame shifting messages (discussed further below) may be determined from the frame shift fields of the message.

While the above mentioned features of the CMF display may be determined by the display formatting process solely from data include in the CMF record, additional features may be determined through reference to the display templates and display versions databases of the display object. For example, the particular manner in which the elements of the display are arranged may be taken from one of a number of display templates stored in the display templates database. FIG. 16a provides an example of a display templates database which includes template identifiers and associated template data representing a specific way of presenting a CMF display. Thus, beginning from the identifier contained in the CMF display template field of the CMF record, which originates from the display template field of the CMF database, the display object may determine the proper display template for the CMF and format the CMF display accordingly.

In addition to formatting the display of messages, the display object may determine the proper representation of each message to be displayed. This may be accomplished through reference to the CMF record and to the display versions database. FIG. 16b provides an example of a display versions database which includes message components and associated display versions. For example, for the message component "felt", the display versions database may provide the ASCII representation of "felt". The message component database may contain display versions for all message components which are included in messages known to the system. Accordingly, the display object may parse messages included in the CMF record into individual components and assemble display versions of each message.

D. Assisting the user to tailor messages of the CMF in accordance with the needs of present communication Consider now that a CMF is being displayed to the user. While the messages of the CMF may be closely related to what the user wishes to communicate, they may require further adjustment in order to say exactly what the user wishes to communicate. Thus the user may wish to tailor the messages of the CMF in accordance with the needs of present communication. As shown in FIG. 8, tailoring functions provided by the system may include changing the pragmatic parameters of the CMF and changing the lexical item of a message.

A change of pragmatic parameters may be desired by the user when the default pragmatic parameters of the CMF, e.g. the tense or interpersonal focus, are not appropriate for present communication. For example, the CMF may be provided in the present tense (e.g. "I feel sore"), but the user may wish to communicate in the past tense (e.g. "I felt sore"). Similarly, the CMF may be provided in the first person singular (e.g. "I am hurt"), but the user may wish to refocus the topic on a third party (e.g. "He is hurt").

Figure 17:
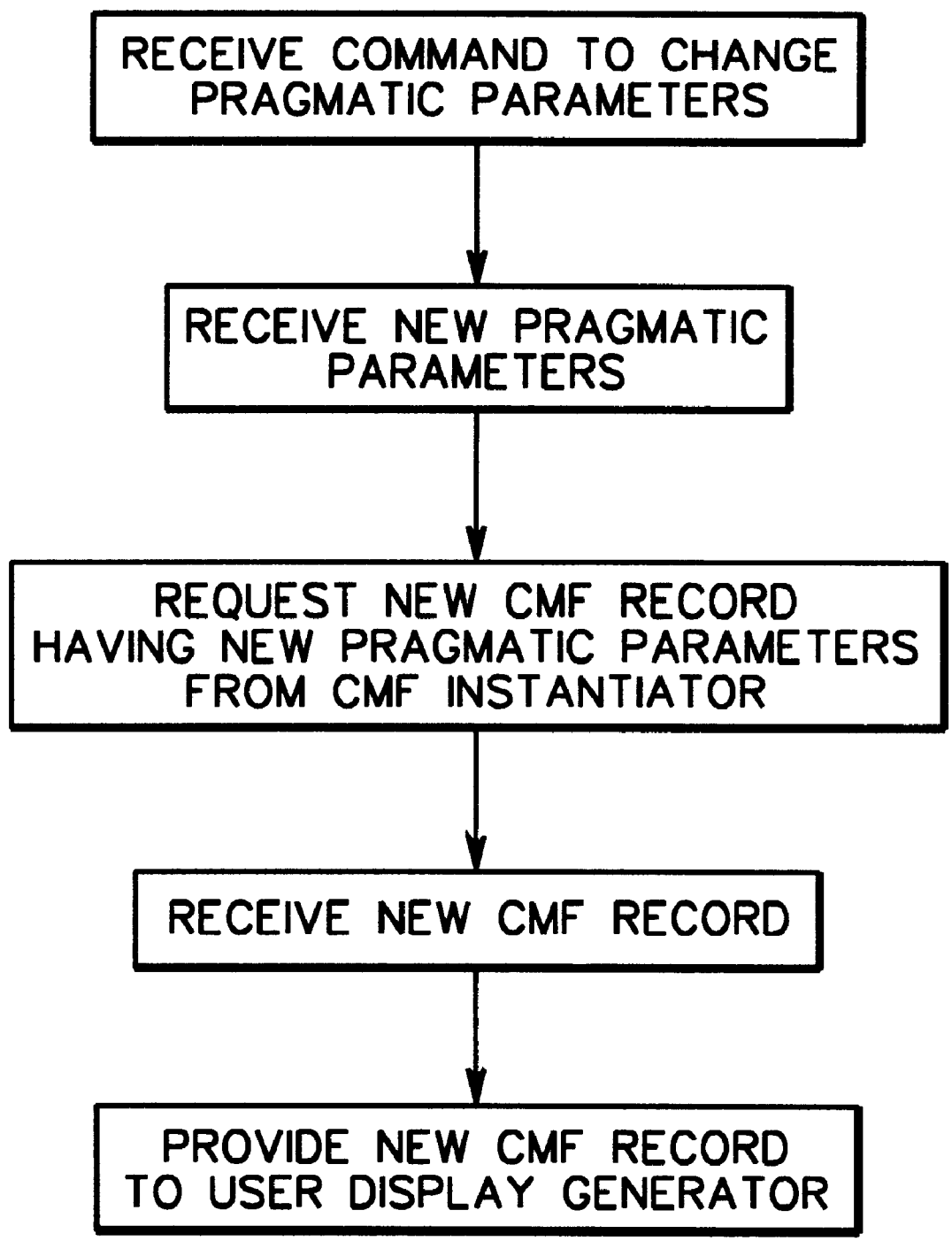
FIG. 17 illustrates an example of a process for changing the pragmatic parameters of a CMF in a user interface object in accordance with a preferred embodiment of the invention.

As noted above, default pragmatic parameters are included in every CMF record of the CMF database, and these will be used to instantiate the CMF. However, the system may allow the user to specify pragmatic parameters once a CMF has been instantiated. An example of a process in the user interface object by which this function may be enabled is provided in FIG. 17. As shown in FIG. 17, to change pragmatic parameters, the user interface object may receive a "change pragmatic parameters" command and receive a specification of new pragmatic parameters. The user interface object may then request the new CMF from the CMF instantiator by providing the identifier of the present CMF along with the new pragmatic parameters. A new CMF instantiated in accordance with the new pragmatic parameters will subsequently be received. The new CMF record may then be provided to the display object for display to the user.

As noted above, a second tailoring function which may be provided by the system involves changing the lexical item contained in the lexical slot of a message frame. For example, while a CMF may include the message "I feel sore", the user may instead wish to communicate a related message such as "I feel tired". A change of lexical item may be enabled through the use of a lexical field generator as illustrated in FIG. 7. As seen in FIG. 7, the lexical field generator may include a database of lexical fields. An example of a lexical field database is illustrated in FIG. 18a. As seen in FIG. 18a, a record of the lexical field database record may include a lexical field identifier field, a lexical items field, and a display version pointer. Accordingly, when the user interface object receives a command to present alternative lexical items, it will determine the lexical field identifier for the message from the CMF record. The lexical field identifier may be provided to the lexical field generator, which in turn may provide the lexical items of the lexical field through reference to the lexical field database. The lexical field may be provided to the user display generator along with the lexical field display version pointer for display to the user. Subsequently the user interface object may receive a selection from the user of one of the alternative lexical items. Upon receiving the selection, the user interface object may update its copy of the CMF record to reflect the new lexical item, and provide the lexical item to the display object to update the display object copy of the CMF record.

A second manner of lexical item tailoring through the use of lexical fields may be provided through an extension of the lexical field generation process described above. As noted in regard to FIG. 18a, each lexical field is identified by a lexical field identifier. By providing a structured taxonomy of lexical fields, the user may be enabled to broaden or narrow the focus of the lexical field from which lexical items for a particular message frame may be selected. For example, as shown in FIG. 18a, the lexical field identified by the identifier "bodypart;location" may include the lexical item "head". In accordance with providing a lexical field focusing function, the lexical field database may be further provided with a lexical field identified as "bodypart;location;head" and which includes lexical items focused on the head, for example, "eye", "ear", "nose", "jaw", etc. Thus the focused lexical field is identified by a concatenation of the identifier of a broader lexical field and a lexical item contained within that field.

Figure 18B:
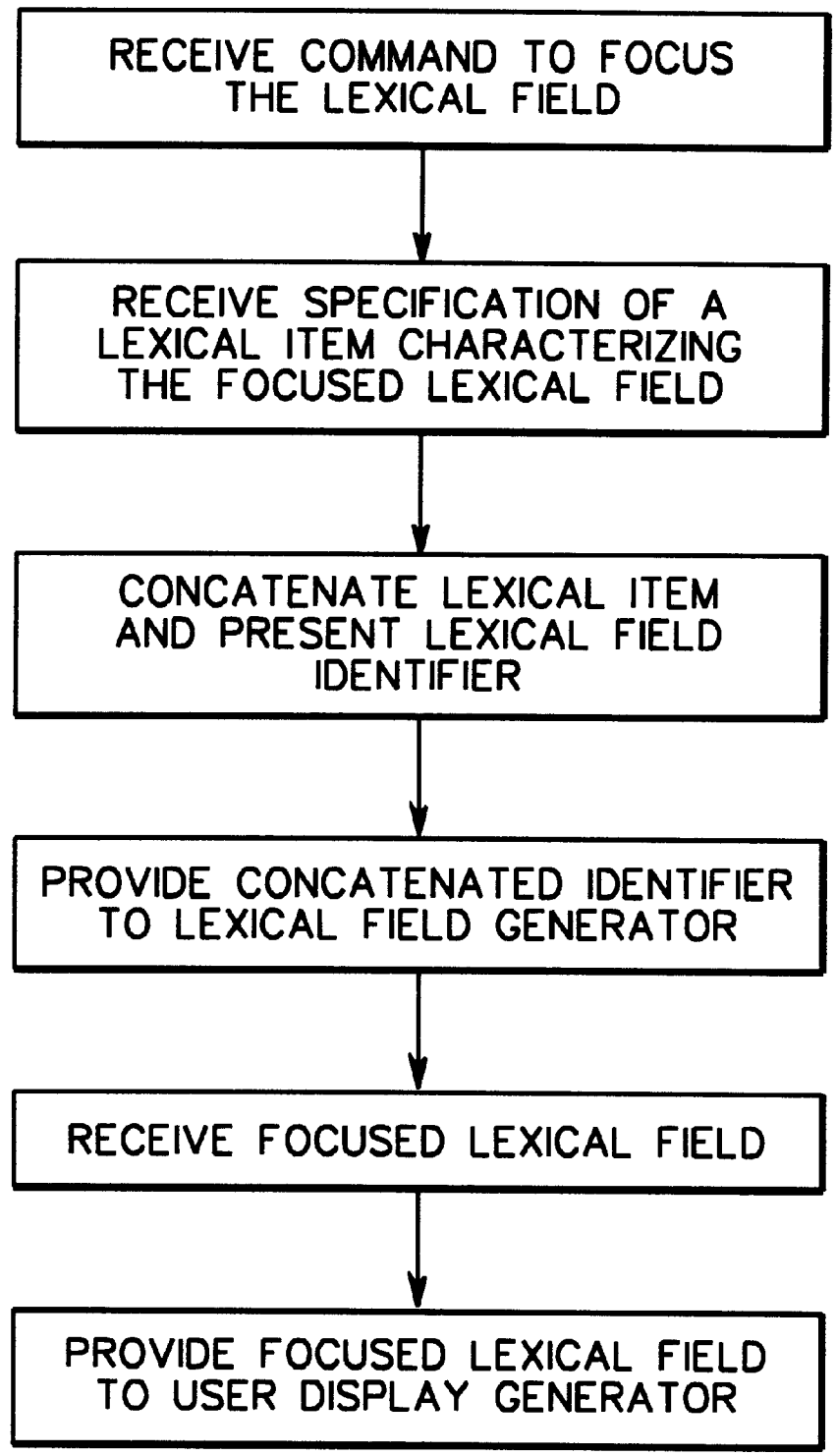
FIG. 18b illustrates an example of a process for focusing a lexical field in a user interface object in accordance with a preferred embodiment of the invention.

An example of a process in the user interface object for narrowing the focus of the lexical field associated with a message frame is provided in FIG. 18b. As shown in FIG. 18b, when the user interface object receives a command to focus a lexical field and receives a specification of a lexical item characterizing the focused lexical field, the system will concatenate the lexical item and the identifier of the present lexical field of which it is a member. The resulting lexical field identifier may then be provided to the lexical field generator, which will return a focused lexical field having the concatenated identifier if such a field exists. The user interface object may then provide the focused lexical field to the user display object for display to the user.

In addition to direct accessing of lexical fields by means of lexical field identifiers, the system may further enable selection of lexical fields through semantic tag searching. In general terms, the semantic tag searching process may involve providing semantic tags to the lexical field generator, which may search the lexical fields database for lexical fields having matching semantic tags. Two methods may be employed for determining the semantic tags used to search the lexical field database. A first method may involve root word specification as described in Section IIA in regard to accessing a CMF. A second method may involve producing a concatenation of the TDA, CMF, CPF, and MF semantic tags of the message for which alternative lexical items are desired. A search performed using a concatenation of semantic tags may be performed multiple times using alternative concatenations where an initial concatenation has no matches in the lexical field database. For example, where a concatenation of all semantic tags produces no matches, further concatenations may be used which successively drop the TDA, CMF, and CPF semantic tags to produce a less restrictive search attribute.

E. Producing message output

Consider now that a user has determined that a message included in a frame displayed by the system is one which he wishes to communicate. The user will accordingly wish to produce the message as output, for example, as synthesized speech. Thus it is desirable for the system to be capable of providing message output in the form of synthesized speech in response to a user command.

As shown in FIG. 7, the system may include a message output generator which includes processes for formatting and producing message output. The message output generator may thus produce output messages upon receiving data specifying the message to be produced.

Figure 19A:
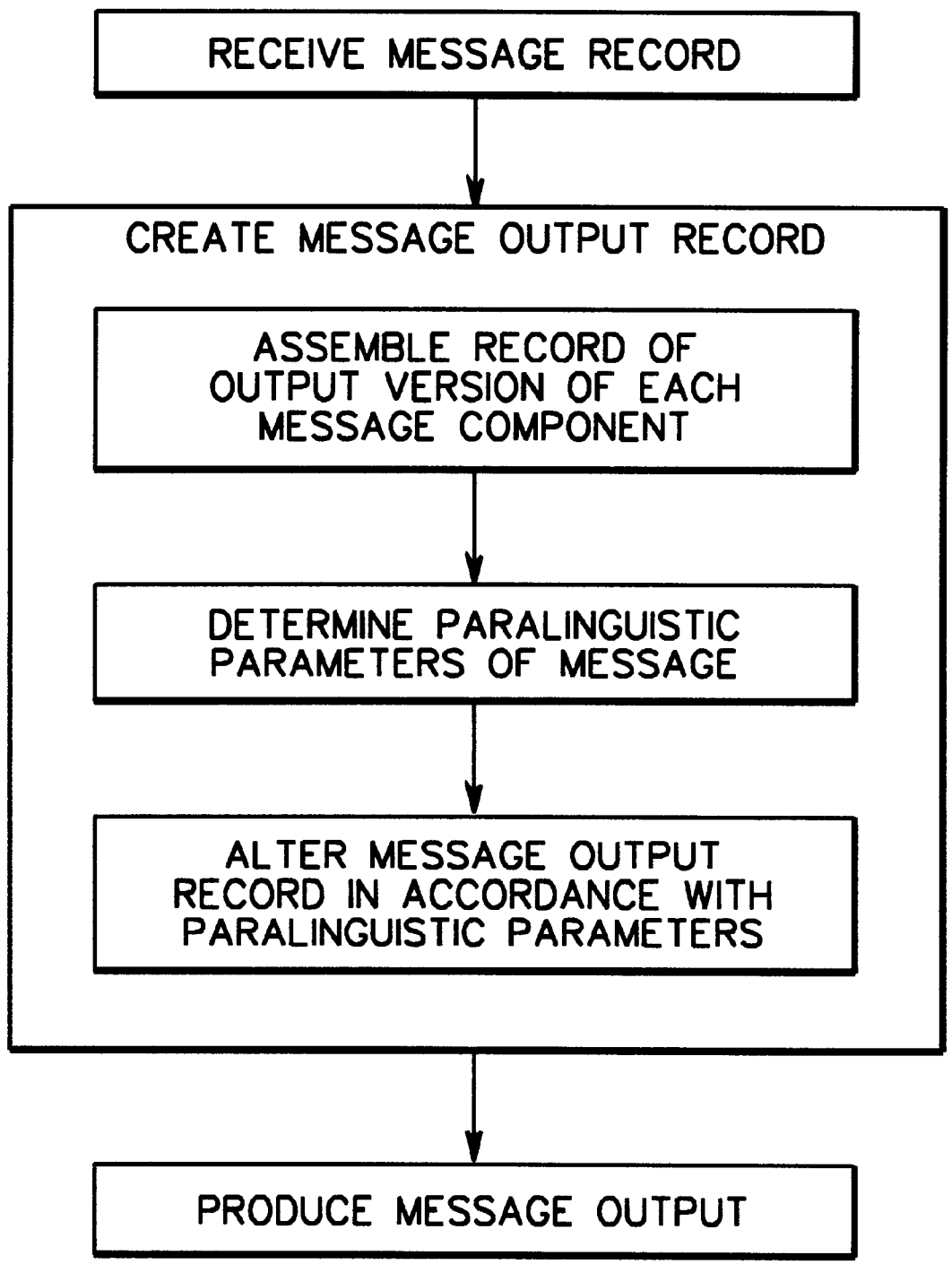
FIG. 19a illustrates an example of a process for producing a message output record in an output object in accordance with a preferred embodiment of the invention.

An example of a process for formatting output is provided in FIG. 19a. As shown in FIG. 19a, upon receiving a message record from the user interface, the message output generator will create a message output record which may be utilized by the "produce output" process to generate the message in the form of synthesized speech. The creation of the message output record may involve three steps. First the output object may assemble a message output record comprising an output version for each of the components of the message. This may be accomplished through reference to an output version database which is included in the output object. An example of an output version database is provided in FIG. 19b. As seen in FIG. 19b, records in this database include a message component identifier field identifying a particular message component, and an associated output version field containing the message component in a synthesized speech data format. As further shown in FIG. 19a, the output object may subsequently determine paralinguistic parameters associated with the message. This may be accomplished through reference to a paralanguage specifier database which is included in the output object. An example of a paralanguage specifier database is provided in FIG. 19c. As seen in FIG. 19c, records in this database include a MF identifier field identifying a particular message frame, and an associated paralinguistic control parameter field specifying parameters which are specific to that message frame. In the example of FIG. 19c, the control parameters may be interpreted as follows: Intonation contour (I)=2 predefined contour (D2); Pitch Variability (PV)=3; Loudness (L)=2; Display Characteristics (DC)=Synthesized Speech (SSP). As further shown in FIG. 19a, the output object may then alter the output message record in accordance with the paralinguistic parameters. The output message record will then be in proper form for providing to an output process which will generate the output method in accordance with conventional speech synthesis or visual display techniques.

F. Navigation to a new CMF through user updating of the attributes of the subject of communication to match those of the new subject of desired communication Consider now that the user has commanded the system to produce an output message and the message has been produced. Further communication between the user and another conversant may ensue and the user may wish to produce another message. Depending on the direction of communication, the next message may be related to the prior message, or it may be unrelated. In the latter case the user may use one of the methods described in Section IIA to select a new CMF having topical and contextual attributes which are appropriate for present communication. However, if present communication is related to the presently displayed CMF, it is desirable to enable the user to navigate directly to a new CMF based on that relationship.

A system in accordance with the invention may provide navigational functions in a variety of manners. In a first manner, referred to as message-based navigation, the user may directly instantiate a CMF which is described by a message displayed in association with a present CMF. As an example, consider again the CMFs of FIG. 1. It may be seen from FIG. 1 that a predefined relationship exists between the "Cold/Flu" CMF of the "Illness" TD and the "Doctor" CMF of the "Talk About People" TD. In accordance with message-based navigation, an appropriate message of the "Cold/Flu" CMF may be used as a navigation tool to instantiate the "Doctor" CMF directly from the "Cold/Flu" CMF. Referring to FIG. 6, it may be seen that the "Cold/Flu" CMF includes the message "I need to see the doctor". This message may be predefined as being useable for navigating directly from the "Cold/Flu" CMF to the "Doctor" CMF. The availability of the message for use as a navigational tool may be indicated to the user by displaying the message in a recognizable manner, for example, as shown in FIG. 15, by displaying the message in italics.

Figure 20A:
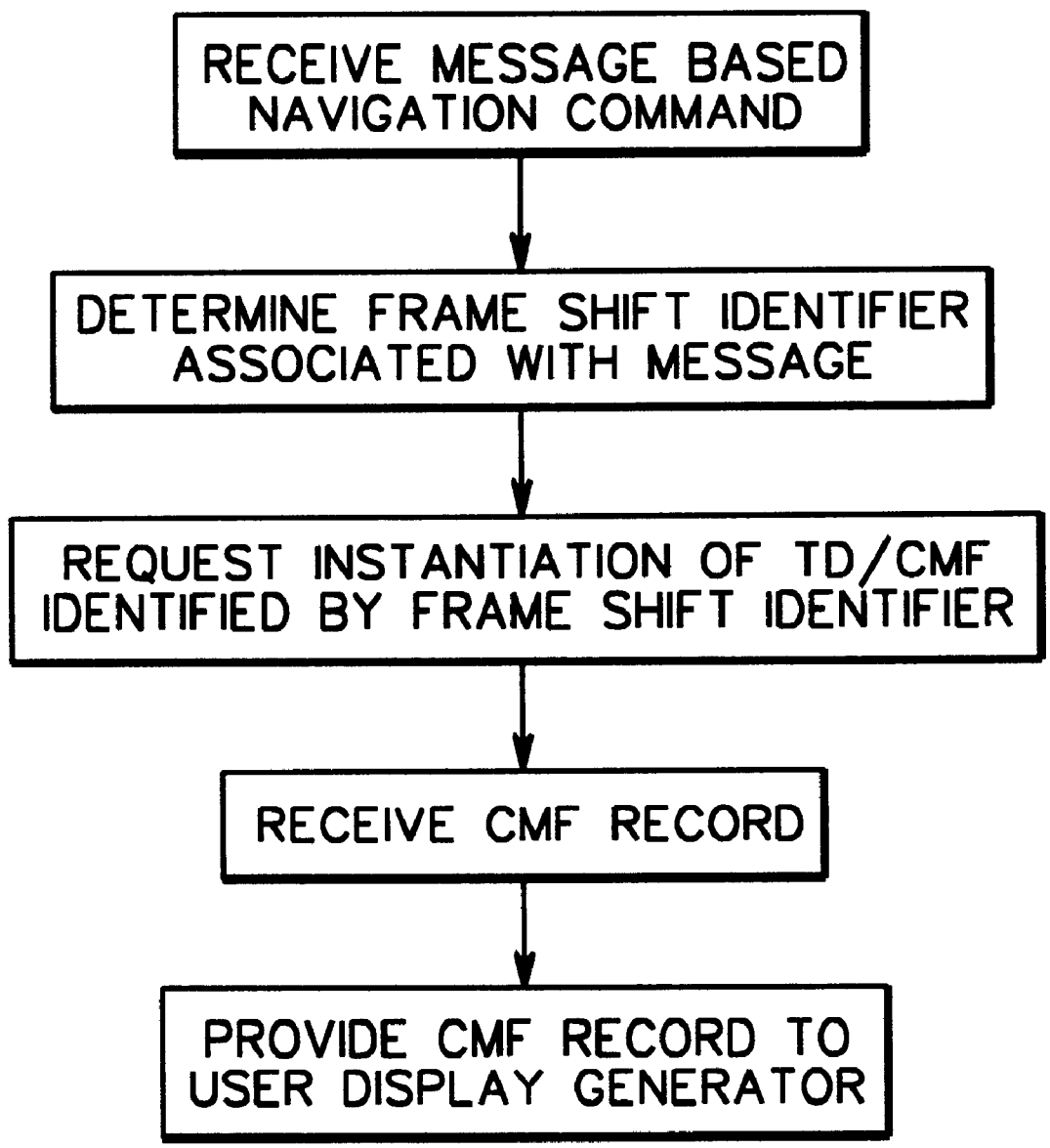
FIG. 20a illustrates an example of a process of providing message-based navigation in a user interface object in accordance with a preferred embodiment of the invention.

An example of a method in the user interface object for providing message-based navigation is illustrated in FIG. 20a. As indicated in FIG. 20a, the message-based navigation process may be invoked upon receiving a message-based navigation command. This command could be entered by the user, for example, by indicating the message with a pointing device. Once the command has been received, the user interface object may determine the TDA and CMF identifiers associated with that message through reference to the frame shift identifier field associated with that message. Upon determining the TDA and CMF associated with the message, the user interface object may request instantiation of that CMF from the CMF instantiator, and will subsequently be provided with a CMF record. The user interface object may then provide the updated CMF record to the display object.

Figure 20B:
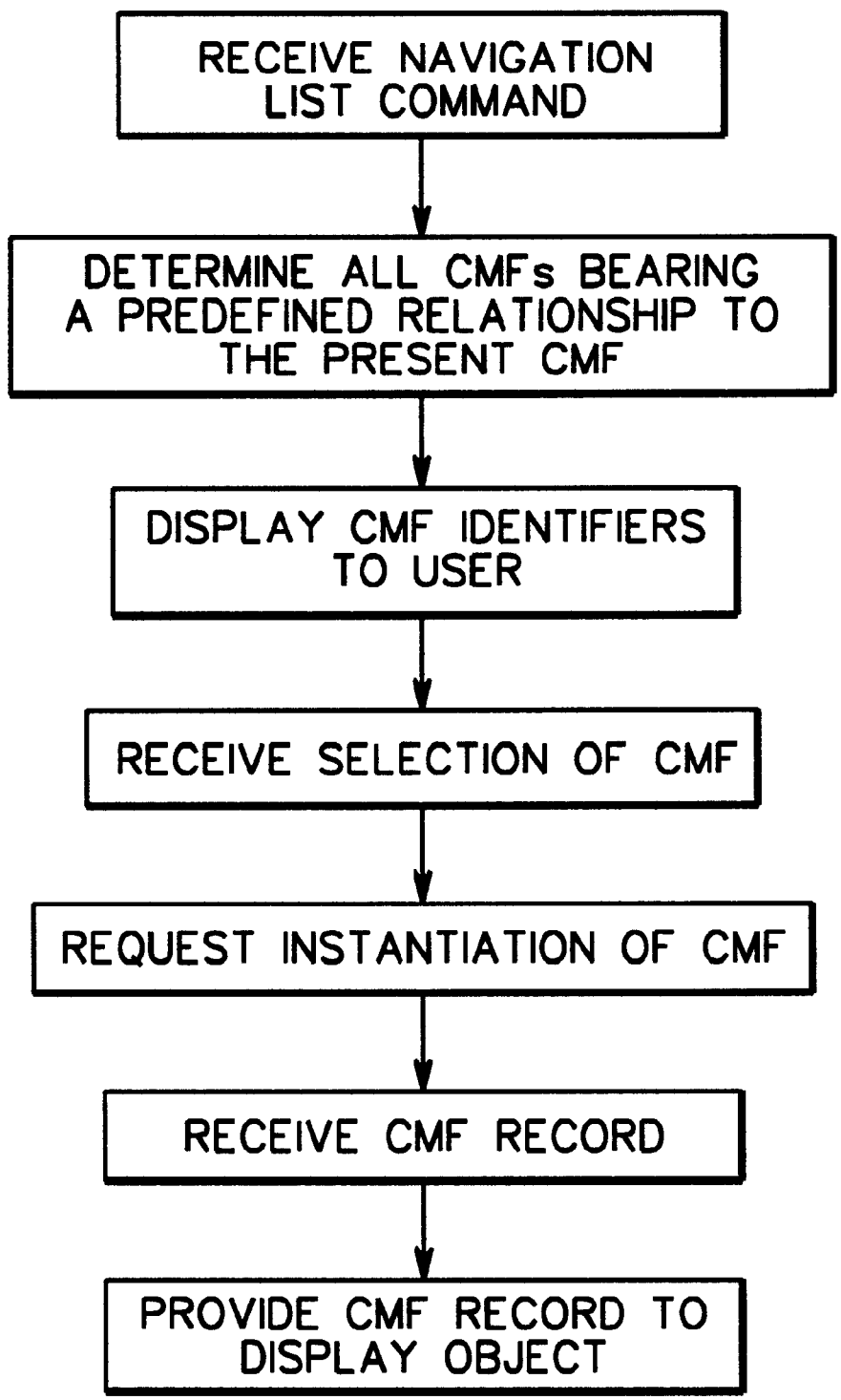
FIG. 20b illustrates an example of a process of providing navigation in a user interface object in accordance with a preferred embodiment of the invention.

A second manner of providing a navigational function may involve allowing the user to choose from a list of CMFs which bear predefined relationships to the CMF of present communication. An example of a process in the user interface object for providing navigation in this manner is illustrated in FIG. 20b. As shown in FIG. 20b, upon receiving a navigation list command, the user interface object will determine all CMFs which bear a predefined relationship to the CMF of present communication. This may be accomplished by assembling a list of all CMFs identified by frame shift tags in the present CMF record. It is noted that the various tags contained in the CMF record will have originated from a number of sources including the TDA database, CMF database, CPF database, and MF database. Once these CMFs are determined, their identifiers may be displayed to the user, upon which a selection of a CMF may be received from the user. The user interface object may then request instantiation of that CMF from the CMF instantiator, and will subsequently be provided with a CMF record.

A further manner of navigation may be provided by the user interface object in which the user is enabled to directly instantiate any CMF which is a "nearest neighbor" to the presently instantiated CMF. In this manner of navigation, the user navigates to a new CMF by indicating the "direction" of communication relative to the present CMF. Referring to FIG. 1, consider that a user of the system has instantiated the "Headache" CMF. From the TD map it may be seen that neighboring CMFs include the more specific CMF "Migraine", the equally specific CMF "Backache", and the less specific "Aches & Pains". It is conceivable that a user could wish to proceed to any of these CMFs from the CMF "Headache". Accordingly, the system may allow the user to navigate to these nearest neighbors by indicating whether the new CMF is to be more specific, equally specific, or less specific.

Figure 21:
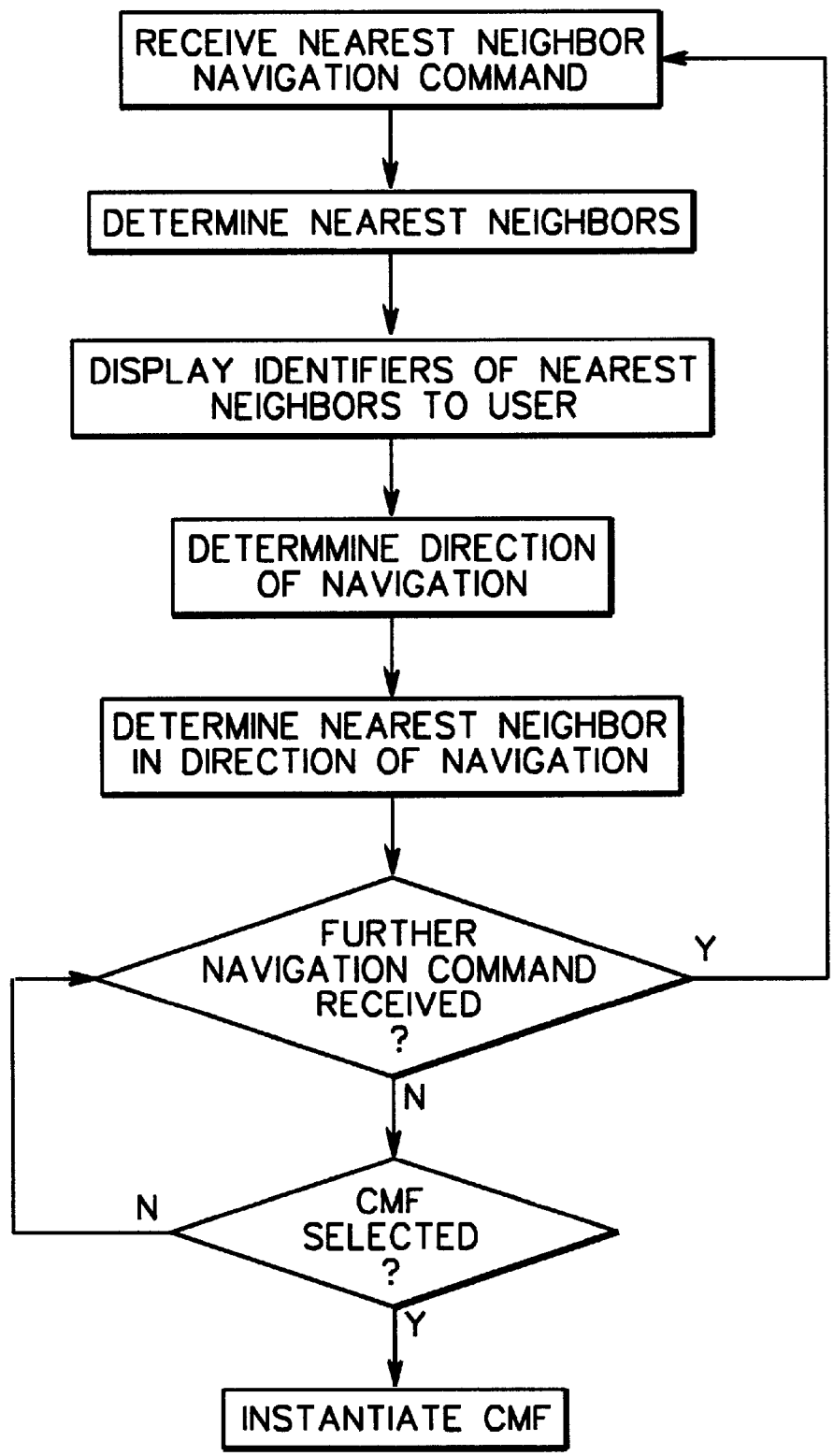
FIG. 21 illustrates an example of a process for providing "nearest neighbor" navigation in accordance with a preferred embodiment of the invention.

An example of a process in accordance with the invention for providing nearest neighbor navigation is illustrated in FIG. 21. As shown in FIG. 21, when a nearest neighbor navigation command is received by the user interface object, the nearest neighbors are determined. Upon determining the nearest neighbors, identifiers of the nearest neighbors may be displayed to the user. The identifiers may be displayed in a manner similar to that shown in FIG. 1. The system may then determine the direction of navigation. This may be determined from user input, for example, the use of an arrow key. The user interface object may then determine the nearest neighbor in the direction of navigation. If a further navigation command is received, the user interface object may again determine the direction of navigation and the nearest neighbor in that direction of navigation. Where the CMF for which nearest neighbors are to be determined is not the CMF for which a record has been instantiated, the user interface object may determine the nearest neighbors by submitting a query to the TDA generator, which will return the nearest neighbors listed in the appropriate field for the frame of reference in the TDA database. When a command indicating selection of a CMF is entered by the user, the CMF may be instantiated as described above.

Thus the invention may be embodied in a frame-based ACT system implemented on a computer data processing system. The system may include predefined messages which bear predefined relationships to subjects of communication. The messages may be organized in accordance with frames which address particular subjects of communication. A user of the system may thus be presented with a set of messages by specifying attributes of the subject of desired communication. This specification may be done directly at any time by invoking any one of several commands for choosing a communication frame. Alternatively, where the user has already initiated a communication frame, specification of attributes of the subject of desired communication may be accomplished through the use of navigational functions which present the user with choices of CMFs which possess attributes shared in common with the CMF of present communication. Navigation thus effectively updates the system's knowledge of the subject of present communication rather than requiring the user to completely respecify the subject. The system may produce output based on user selection of a message displayed in conjunction with a CMF provided in response to user specifications.

III. Modifications of the Disclosed Embodiment in Accordance with the Invention

The embodiment of the invention described above includes fundamental functional components which are preferred to be included in systems in accordance with the invention. In addition to the features described therein, additional features may be implemented which may be found to be desirable depending on the particular needs of the application. A variety of manners in which the disclosed embodiment may be modified to include further features in accordance with the invention are disclosed below.

A. User interface

It is contemplated that a variety of known devices may be integrated with the system for use as user input devices. Examples of such devices include switches, adapted keyboards, touch screens, infrared pointers, eye movement detection systems, and other physiological detection systems.

B. System control and processing functions

A first modification of system control and processing functions may involve caching of CMF records. Caching is a known technique for storing frequently used data in active memory to minimize delays resulting from storage device access functions. Accordingly, it may be desirable to implement a caching scheme in which a predefined number of CMF records, for example, one hundred records, are maintained in cache memory. Where CMF records are cached, functions involving the instantiation of new CMFs may including a search of cache memory prior to instantiation to determine whether a record for the CMF already exists. Such caching eliminates duplicative instantiation and the added storage device access delays which it entails.

C. User display and message output

A second area of modification may involve the displays provided to the user. The embodiment described above addresses a fully text based display. However, displays may alternatively be provided in some or all instances in the form of graphic representations. For example, a lexical field containing names of parts of the body could be replaced by a graphic of the body which allows the user to indicate the body part of interest. It will be apparent that such functions may be added to implementations of the invention, for example, through additional databases in the display generator and appropriate pointers in other databases of the system such as the lexical field database.

Similarly, it may be desirable to provide a graphical user interface for the purpose of nearest neighbor navigation. Such a display could illustrate, in a manner similar to that of FIG. 1, the user's present CMF and neighboring CMFs which can be navigated to from that CMF. It may alternatively be desirable to continuously provide a nearest neighbor map display as part of the user interface. It will be apparent that such functions may be added to implementations of the invention, for example, through additional functions in the user interface object and TD attribute generator for providing nearest neighbor information, along with appropriate display functions in the display generator.

A further contemplated modification regards paralinguistic modification of the user display. More specifically, it may be desirable to allow paralinguistic modifications to be reproduced for the user on the user display. This may be accomplished in a manner analogous to the paralinguistic modification of message output disclosed above.

Regarding the production of message output by the system, it may be desirable to enable output in a variety of formats including character strings, graphical representations, printed text or images. Images in particular may include images captured by the user for the purposes of later reproduction during the course of communication. It may further be desirable to enable the device to provide output in the form of machine readable commands for operation of other computer-controlled devices. It will be apparent that such modifications may be added to implementations of the invention, for example, by providing an output version database which is appropriate for the desired output format.

D. Message instantiation

Regarding message instantiation, it is contemplated that environmentally determined pragmatic parameters may be implemented. An example of an environmentally determined pragmatic parameter is the time of day. For example, based on the time of day, a greeting message may be formulated as either "Good morning", "Good afternoon", or "Good evening". Such a pragmatic parameter may determined through reference to a system clock.

A further contemplated modification regarding message instantiation involves the use of a semantic database for purposes of assembling lexical fields. In accordance with such a modification, a semantic database may be provided which associates lexical items with semantic tags. Lexical fields may thus be assembled based on semantic tags associated with the subject of communication. These could comprise, for example, semantic tags associated with the CMF and CPF of present communication.

E. System customization tools

It may be desirable to provide a variety of automatic and user-invoked system customization tools. A first contemplated customization tool involves a message editor. Such an editor may provide simple editing functions so that a user may directly edit a displayed message before commanding the system to produce the message as output.

A second contemplated customization tool involves custom generation of communication frames. Such a tool may allow a user to design a communication frame in its entirety or to edit an existing communication frame. It will be apparent that such tools may operate by receiving input from the user and updating or supplementing the systems various databases accordingly.

A third contemplated customization tool involves automatic monitoring of use of lexical items and alteration of the default lexical items in accordance with the user's history of use. Such a tool may operate by noting the number of times each lexical item of a lexical field is utilized and by altering the default lexical item accordingly.

A fourth contemplated customization tool involves providing information regarding history of use to the user. Such customization tools may provide historical data regarding the user's most often used CMFs and most recently used CMFs, and use this data as a means for directly instantiating a CMF.

While the specific embodiments disclosed herein provide structures and methods which are best modes presently known to the inventors for carrying out the invention, the invention is capable of a variety of alternative embodiments. The flow diagrams, hardware configurations and processes depicted herein are exemplary. Those of ordinary skill in the art will be aware of other modifications involving equivalent components, methods of operation and methods of use which may be made to the embodiments described herein without departing from the scope of the invention as defined in the following claims.

What is claimed is:

1. A method for providing augmentative communication comprising:
   providing a set of predefined messages having a predefined association with a predefined subject of communication;
   receiving a command from a user to replace a lexical item displayed in a predefined lexical slot of one message of said set of predefined messages; and
   determining a set of substitution lexical items having a predefined association with said predefined subject and said one message.

2. The method of claim 1, further comprising:
   receiving specification from the user of one substitution lexical item of said set of substitution lexical items; and altering said predefined lexical slot of said one message to replace said lexical item of said message with said one substitution lexical item of said set of substitution lexical items.

3. The method of claim 1, further comprising:

receiving specification of one substitution lexical item of said set of substitution lexical items; and determining an alternative set of substitution lexical items having a predefined association with said predefined subject and said one lexical item.

4. The method of claim 1, wherein the predefined subject of communication comprises at least one of a communication frame and a component frame.

5. The method of claim 4 wherein the determining set of substitution lexical items further comprises determining a lexical field identifier based on the at least one of a communication frame and a component frame.

6. The method of claim 5 wherein the determining a set of substitution lexical items further comprises providing the lexical field identifier to a lexical field generator.

7. The method of claim 6 wherein the determining a set of substitution lexical items further comprises providing the set of substitution lexical items from a lexical field data base of the lexical field generator.

8. A system for providing augmentative communication comprising:

means for providing a set of predefined messages having a predefined association with a predefined subject of communication;

means for receiving a command from a user to replace a lexical item displayed in a predefined lexical slot of one message of said set of predefined messages; and means for determining a set of substitution lexical items having a predefined association with said predefined subject and said one message.

9. The system of claim 8, further comprising:

means for receiving specification from the user of one substitution lexical item of said set of substitution lexical items; and means for altering said predefined lexical slot of said one message to replace said lexical item of said message with said one substitution lexical item of said set of substitution lexical items.

10. The system of claim 8, further comprising:

means for receiving specification of one substitution lexical item of said set of substitution lexical items; and means for determining an alternative set of substitution lexical items having a predefined association with said predefined subject and said one lexical item.

11. The system of claim 8, wherein the predefined subject of communication comprises at least one of a communication frame and a component frame.

12. The system of claim 11, wherein the means for determining a set of substitution lexical items further comprises means for determining a lexical field identifier based on the at least one of a communication frame and a component frame.

13. The system of claim 12, wherein the means for determining a set of substitution lexical items further comprises means for providing the lexical field identifier to a lexical field generator.

14. The system of claim 13, wherein the means for determining a set of substitution lexical items further comprises means for providing the set of substitution lexical items from a lexical field database of the lexical field generator.

15. A computer program product comprising a computer useable medium having computer readable program code means therein for providing augmentative communication, the computer readable program code means in the computer program product comprising:

computer readable program code means for providing a set of predefined messages having a predefined association with a predefined subject of communication;

computer readable program code means for receiving a command from a user to replace a lexical item displayed in a predefined lexical slot of one message of said set of predefined messages; and computer readable program code means for determining a set of substitution lexical items having a predefined association with said predefined subject and said one message.

16. The computer program product of claim 15, further comprising:

computer readable program code means for receiving specification of one substitution lexical item of said set of substitution lexical items; and computer readable program code means for altering said predefined lexical slot of said one message to replace said lexical item of said message with said one substitution lexical item of said set of substitution lexical items.

17. The computer program product of claim 15, further comprising:

computer readable program code means for receiving specification of one substitution lexical item of said set of substitution lexical items; and computer readable program code means for determining an alternative set of substitution lexical items having a predefined association with said predefined subject and said one lexical item.

18. The computer program product of claim 15, wherein the predefined subject of communication comprises at least one of a communication frame and a component frame.

19. The computer program product of claim 18 wherein the computer readable program code means for determining a set of substitution lexical items further comprises computer readable program code means for determining a lexical field identifier based on the at least one of a communication frame and a component frame.

20. The computer program product of claim 19 wherein the computer readable program code means for determining a set of substitution lexical items further comprises computer readable program code means for providing the lexical field identifier to a lexical field generator.

21. The computer program product of claim 20 wherein the computer readable program code means for determining a set of substitution lexical items further comprises computer readable program code means for providing the set of substitution lexical items from a lexical field database of the lexical field generator.

* * * * *